United States Patent

Gamadia

[11] 4,053,089
[45] Oct. 11, 1977

[54] PUMP FOR DISPENSING LIQUIDS

[75] Inventor: Rustom Kooverji Gamadia, London, England

[73] Assignee: Lever Brothers Company, New York, N.Y.

[21] Appl. No.: 692,515

[22] Filed: June 3, 1976

Related U.S. Application Data

[63] Continuation-in-part of Ser. No. 604,744, Aug. 14, 1975, abandoned, which is a continuation of Ser. No. 528,642, Dec. 2, 1974, abandoned.

[30] Foreign Application Priority Data

| Aug. 1, 1975 | United Kingdom | 32268/75 |
| Aug. 1, 1975 | United Kingdom | 32269/75 |
| Mar. 3, 1976 | United Kingdom | 8495/76 |
| Mar. 23, 1976 | United Kingdom | 11641/76 |

[51] Int. Cl.² .................................. G01F 11/32
[52] U.S. Cl. .................................. 222/321; 417/245; 222/341

[58] Field of Search ............... 222/384, 321, 340, 341, 222/385, 209, 335, 322, 339, 378, 379, 383; 417/245, 490, 542, 259; 239/333

[56] References Cited

U.S. PATENT DOCUMENTS

| 3,065,701 | 11/1962 | Bessiere | 417/245 |
| 3,865,313 | 2/1975 | Kondo | 222/383 X |

Primary Examiner—Stanley H. Tollberg
Attorney, Agent, or Firm—Melvin H. Kurtz

[57] ABSTRACT

A pump dispenser for liquids includes a finger operated piston and cylinder, a valve to allow liquid to enter the pump dispenser during a filling stroke, a chamber to receive said liquid and to store it under increasing hydraulic pressure during a discharge stroke, a spring for storing strain energy as the hydraulic pressure increases, a means for releasing the stored energy when the piston has travelled a predetermined distance relative to its cylinder and a discharge outlet through which liquid is discharged from the chamber as the strain energy is released.

17 Claims, 22 Drawing Figures

PUMP FOR DISPENSING LIQUIDS

This application is a continuation in part of application Ser. No. 604,744 which application was filed on Aug. 14, 1975, now abandoned, and is, in turn, a continuation of Application Ser. No. 528,642 filed on Dec. 2, 1974, now abandoned.

The invention relates to a pump for dispensing liquids, gels or foams, hereinafter referred to as "liquids".

In a conventional pressurised pack dispensing device, such as an aerosol can, a liquid product to be dispensed is normally stored under positive pressure in admixture with a liquefied gaseous propellant. When the product is dispensed from this type of device, it is therefore usually accompanied by propellant in liquid or gaseous form which can assist in atomising the product, but which can in other respects be detrimental to the product and be disliked by the consumer. The use of a liquefied gas propellant in particular can furthermore create a problem, for the formulator, for example because of phase separation in the pack or other incompatability with the other ingredients of the product. The use of a liquefied gas propellant does, furthermore, add to the cost of the product. Accordingly, it is apparent that it could be beneficial both to the manufacturer and to the consumer if liquid products of the type normally dispensed in aerosol form from pressurised packs could be dispensed without the need to employ any liquefied gaseous propellants.

Many attempts have in the past been made to develop an efficient and effective finger-operable pump for dispensing propellant-free liquid products in aerosol form, as an alternative to the conventional propellant based pressurised pack dispensing devices. None of these finger-operable pumps has, however, so far been capable of delivering the product in a predictable and uniform spray pattern at near constant pressure each time the pump is actuated, irrespective of variations in applied finger-pressure.

The main problem which has been encountered with finger-operable pumps is that delivery can commence soon after finger force has been applied to the actuating button, and the pressure at which the product is dispensed, as judged by the degree of atomisation, is often dependant on the finger force applied. The net result is that in use, pumps such as these frequently show a tendancy to dribble or drip, particularly at the commencement and end of the dispensing stroke, unless the user is able to depress the actuating button sharply enough to effect efficient atomisation while directing the spray in the desired direction.

With a view to solving these problems, we have developed a finger-operable pump for dispensing liquids which does not suffer from these disadvantages.

It is therefore an object of the invention to provide a finger-operable pump having a feed chamber of variable volume which is capable of delivering a liquid product in atomised form, in which the spray pattern is predictably uniform.

It is also an object of the invention to provide a finger-operable pump which is capable of repeatedly delivering equal volumes of a liquid product.

It is a further object of the invention to provide a finger-operable pump in which the pressure at which liquid product is dispensed is always substantially the same, irrespective of the finger force applied to the actuator button and the rate at which that button is depressed.

It is yet a further object of the invention to provide a finger-operable pump in which when finger force is applied to the actuator button, delivery of the liquid product is delayed until a predetermined hydraulic pressure has been built-up within the pump, or until the actuator button and hence the end wall of the feed chamber has been displaced by a predetermined distance, thereby to reduce the volume of a feed chamber within the pump to its minimum value.

It is yet a further object of the invention to provide a finger-operable pump in which means is provided for triggering the delivery of liquid product in atomised form without interruption of the adjacent surfaces of the feed chamber within the pump which define the outline of that chamber.

According to the invention, there is provided a finger operable pump for dispensing liquids comprising an axially arranged feed chamber having a finger displaceable end wall, axial movement of which will vary the volume of said feed chamber; a pressure actuable valve to permit entry of a liquid product from an external supply to the feed chamber, said valve and said feed chamber being so positioned that downward axial movement of the finger displaceable end wall toward said valve reduces the volume of the feed chamber and increases hydraulic pressure therewithin, and upward axial movement of the finger displaceable end wall away from said valve increases the volume of the feed chamber and reduces hydraulic pressure therewithin; an axial discharge chamber in communication with said feed chamber; a resilient means positioned co-operably with the discharge chamber for storing energy generated by the increased hydraulic pressure which results from downward movement of the finger displaceable end wall with respect to the feed chamber; a discharge conduit communicating the discharge chamber with the atmosphere exterior to the pump; valve means for releasing the energy stored in the resilient means and for conducting the liquid product from the discharge chamber to the discharge conduit, said valve means being operable to release the energy and provide a conduit for the liquid product only after the finger displaceable end wall has moved downwardly with respect to the feed chamber by a predetermined distance, the finger displaceable end wall forming a liquid tight seal with a side wall of the chamber at least until after said valve means is operated.

The pump essentially consists of an axially arranged feed chamber having a finger displaceable end wall. Axial displacement of this end wall will vary the volume of the feed chamber. This can for example be achieved by connecting the end wall external to the feed chamber to a stem to which can be attached a suitable actuator button. In this arrangement, displacement of the actuator button will also displace the end wall by way of the connecting stem.

In one embodiment of the invention, the feed chamber is a cylinder and the finger displaceable end wall is a piston slidably positioned in the cylinder, the piston being fitted with a stem carrying an actuator button for finger displacement.

In another embodiment of the invention, the feed chamber is an axially positioned bellows having an integral or sealably fitted finger displaceable end wall.

Associated with the pump is a pressure actuable valve which is arranged to permit entry of a liquid product to the feed chamber from an external supply, for example from the can, bottle or other container to which the pump is attached. The valve can, for example, be arranged to open to admit liquid product to the feed chamber during a filling stroke when the pressure in the feed chamber falls below that in the container.

In one embodiment of the invention this pressure actuable valve is a one-way ball valve. Alternatively, it can be a check or flap valve which operates as a non-return valve. Such valves can be provided with a coil spring or other resilient means to hold them normally closed.

The feed chamber, its finger displaceable end wall and the pressure actuable valve are so positioned that downward axial movement of the finger displaceable end wall toward the valve will reduce the volume of the feed chamber and increase hydraulic pressure therewithin, and upward axial movement of the finger displaceable end wall will increase the volume of the feed chamber and reduce the hydraulic pressure therewithin.

The pump is also provided with an axial discharge chamber which can be positioned above or below or to the side of the axial feed chamber. Preferably the discharge chamber is positioned co-axially with respect to the feed chamber, either below it or around it in which latter case the discharge chamber is annular in cross section and where appropriate is hereinafter referred to as an annular discharge chamber.

The feed chamber and the discharge chamber are in communication with each other so that liquid product can pass between them. When the discharge chamber is annular in form and co-axially positioned with respect to the feed chamber, at least one radial passageway can provide communication between the chambers, the passageway thus providing a conduit to enable the liquid product to pass from the feed chamber to the annular discharge chamber when the hydraulic pressure in the feed chamber is increased. This radial passageway can also function to ensure that the liquid product is thoroughly mixed within the pump before it is discharged to atmosphere, by virtue of the shear to which it is subjected as it passes rapidly from the feed chamber to the annular discharge chamber. This is particularly valuable where the liquid product to be dispensed is multiphase or in the form of a shearable gel.

A resilient means, for example a spring, is positioned co-operably with the axial discharge chamber. This resilient means is capable of storing energy generated by the increase in hydraulic pressure which results from the downward movement of the finger displaceable end wall of the feed chamber. When the resilient means is a spring, it can conveniently be accommodated within the axial discharge chamber or co-axially with it.

According to a preferred embodiment of the invention, the axial discharge chamber houses at least one plunger which is slidably located therein together with the spring for storing energy which functions as the resilient means. The plunger is resiliently loaded by the spring and is arranged to move against the force exerted by the spring when hydraulic pressure in the axial discharge chamber on the side remote from the spring increases. In a modification of this embodiment a second plunger is provided in the discharge chamber together with its own spring for storing energy which functions as a second resilient means. In this modification, the two plungers with their respective springs can be mounted in the opposite ends of the axial discharge chamber so that they are arranged to move apart against their respective springs when hydraulic pressure in the axial discharge chamber increases, and move toward each other when hydraulic pressure in this chamber increases.

According to another preferred embodiment of the invention, the axial discharge chamber comprises a bellows, which is positioned to expand while receiving liquid product from the feed chamber and to contact while discharging liquid product to atmosphere, together with the spring for storing energy which functions as the resilient means. The bellows is resiliently loaded by the spring and is arranged to expand against the force exerted by the spring on the outside of the bellow when hydraulic pressure inside the bellows increases.

A discharge conduit is provided to enable the axial discharge chamber to communicate with the atmosphere exterior to the pump, so that liquid product can be discharged when the pump is actuated. Normally this discharge conduit will be interrupted at some point between discharge chamber and the atmosphere and will only provide an uninterrupted pathway for the liquid product to be discharged to atmosphere when the finger displaceable end wall of the feed chamber has moved downwards by a predetermined distance during a downstroke.

Valve means is accordingly provided for triggering the discharge of liquid product at this point in the downstroke. This triggering means also releases the energy stored in the resilient means which forces the liquid product out of the discharge chamber to atmosphere via the discharge conduit.

The valve means for releasing the energy stored in the resilient means can be provided by the coincidence of a passageway interconnecting the axial discharge chamber and the discharge conduit, the coincidence also permitting liquid product to exit from the axial discharge chamber to atmosphere via a suitable atomising nozzle. The respective passageway and conduit in this arrangement only come into coincidence after the end wall of the feed chamber has moved downwardly with respect to the feed chamber toward the pressure actuable valve by a predetermined distance.

The valve means for releasing the energy stored in the resilient means can alternatively be provided by a mechanically actuable valve opening axially through the finger displaceable end wall of the feed chamber, the mechanically actuable valve being so positioned as to be mechanically actuated at the termination of a downward movement of the finger displaceable end wall when the volume of the feed chamber approaches its minimum value. Opening of the valve at this point will also permit liquid product to exit from axial discharge chamber to atmosphere via a discharge conduit and a suitable atomising nozzle.

In particular, there is disclosed herein a novel structural form of this mechanically actuable valve through which the liquid product will be released from the discharge chamber. Thus, in place of the passageway, coincidence of which interconnects the axial discharge chamber and the discharge conduit to permit liquid product to exit to atmosphere, it has been found that if a spigot valve is arranged within the piston, an excellent pump is obtained which can be readily manufactured. The provision of this spigot valve has been found to eliminate many of the problems of leakage around the piston and it also provided a smoother pump action. The invention is however not restricted to the inclusion of the valve means herein described since other valve means can be employed for releasing stored energy after the end wall of the feed chamber has been displaced by a predetermined distance relative to the feed chamber itself.

It is also possible for the valve means to be pressure rather than mechanically actuable, so that it will open only when hydraulic pressure within the pump has increased to a predetermined value.

It is an important feature of the invention that the finger displaceable end wall forms a liquid tight seal with a side wall of the feed chamber, at least until the valve means is operated. This is to ensure that the liquid product under the influence of increasing hydraulic pressure during a downstroke does not prematurely leak past this seal before operation of the valve means to release the liquid product to atmosphere. As soon as the valve means is operated and the liquid product dispensed at the end of a downstroke, there is then no need for the seal between the end wall and a side wall of the feed chamber to be maintained, although we have found that to avoid uneven wear and stress on the parts maintaining this seal, it is preferable that this seal is also maintained after the valve means has been operated.

We have in particular noted that where the feed chamber and its end wall are cylinder and piston respectively, then wear and tear of the sealing surface of the piston in particular is negligible, and efficient dependable trouble-free operation of the pump during repeated use is more likely to be the experience of the user than with a pump in which the sealing surface of the piston exits from or in some way separates from its cylinder at the end of a downstroke each time the pump is actuated.

In an alternative case where the feed chamber and its end wall are constituted by a bellows, it is similarly important to ensure that leakage does not occur where the side wall of the bellows joins the end wall. Preferably, the bellows with its end wall are integral and can for example conveniently be moulded as a single unit in suitable plastics material.

These as well as other advantages of the pump will be more fully understood with reference to the accompanying diagrammatic drawings of which:

It will be noted that in each of the embodiments illustrated in FIGS. 1-20, the axial discharge chamber is annular in form and is accordingly referred to as an annular discharge chamber. This does not apply to the embodiment shown in FIGS. 21 and 22.

Figure 1:
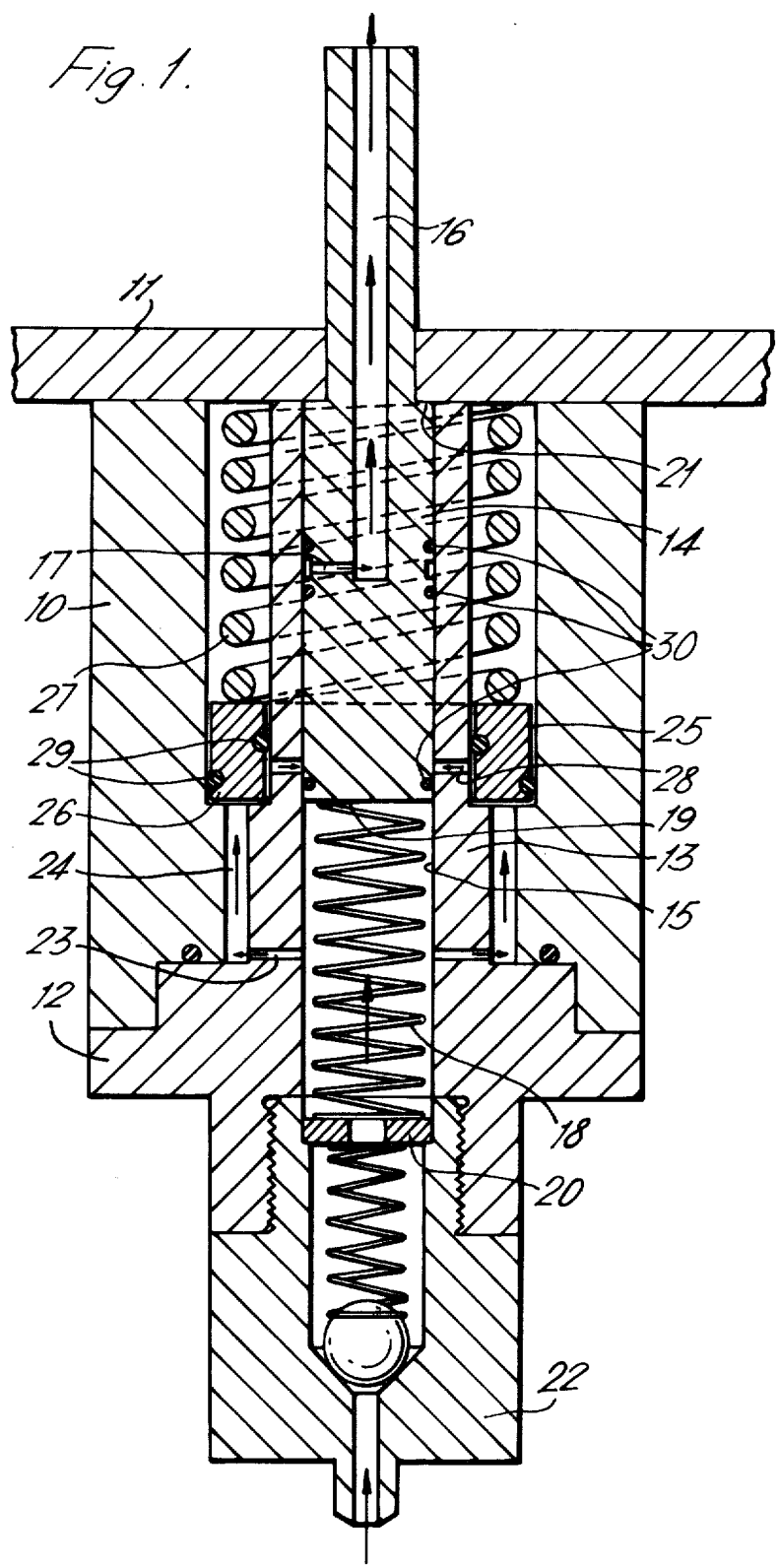
FIG. 1 is a section through a pump in accordance with the invention.

The pump as shown in FIG. 1 consists of a cylindrical outer body 10 closed at one end by an apertured plate 11, and at the other end by a flange 12 of pump cylinder 13, which is located co-axially within the outer body 10.

A finger displaceable piston 14 having O ring seals 30 is slidably positioned in bore 15 of the pump cylinder 13, the upper end of the piston, i.e. the piston stem, passing through the apertured plate 11. The piston 14 and the cylinder 13 together define the feed chamber having the finger displaceable end wall. The piston stem is hollow to provide a discharge outlet 16, which communicates with the atmosphere via an actuating button (not shown). Near its lower end, the piston is provided with radial ducts 17 (only one of which is shown) through the wall of piston 14. The discharge outlet 16 and radial ducts 17 together constitute a discharge conduit.

The pump cylinder 13 also houses a piston return spring 18 abutting lower end 19 of piston 14 and upper face of apertured plate 20. This spring biases the piston towards the apertured plate 11 so that piston shoulder 21 abuts the apertured plate 11. The spacer 20 separates the pump cylinder 13 from a non-return pressure-actuable ball valve assembly 22.

The pump cylinder 13 is provided with first radial passageways 23, two of which are shown, interconnecting the cylinder and annular passageway 24 between outer body 10 and pump cylinder 13. Annular passageway 24 interconnects radial passage ways 23 and annular chamber 25. The annular passageway and annular chamber together constitute the annular discharge chamber. It is these radial passageways, whih communicate the annular discharge chamber and the axial feed chamber to provide a conduit for liquid product to pass from the feed chamber (i.e. cylinder 13) to the annular discharge chamber (i.e. annular passageway 24 and annular chamber 25) when hydraulic pressure in the feed chamber increases.

An annular plunger 26 with seals 29 is slidably positioned in annular chamber 25 and is urged by a second spring 27, (i.e. the resilient means for storing energy) towards annular passageway 24. The lower part of the annular plunger 26, below seals 29 as shown in the drawing, is a loose fit in the annular chamber 25.

The pump cylinder 13 is also provided with second radial passageway 28 which open into annular chamber 25 and the bore 15 of pump cylinder 13. Radial passageways 28 when in communication with radial ducts 17 constitute the valve means for releasing energy stored in the spring 27 and means for conducting liquid product from the annular discharge chamber 24,25 to discharge conduit 16,17. It will be noted that radial passageways 28 and radial ducts 17 are in communication only after the piston 14 has moved downwardly in the bore 15 of cylinder 13 by a predetermined distance.

In the embodiment illustrated in FIG. 1 of the drawings, the cross-sectional area of the annular plunger 26 is 4.6 times that of the piston end 19.

In use, the pump is applied to the top of a container of liquid product so that the non-return pressure actuable ball valve assembly is in contact with the product, if necessary via a dip-tube (not shown).

As the first downstroke of piston 14, the first spring 18 is compressed and air in bore 15 is bled via first radial passageways 23, annular passageway 24, passing annular plunger 26 to atmosphere when radial ducts 17 line up with second radial passageways 28. When piston 14 is released, liquid is drawn up through non-return pressure actuable valve assembly 22 into bore 15.

As the second downstroke of the piston 14, pressure within the bore 15 increases and the liquid is thereby caused to flow via first radial passageways 23 and annular passageway 24 to annular plunger 26. Further increase in pressure of this liquid displaces the annular plunger 26 upwards against the second spring 27, so that liquid flows into the annular chamber 25 and strain energy is stored in the second spring 27. As hydraulic pressure increases still further, displacement of annular plunger 26 increases to accommodate the liquid until radial ducts 17 line up with second radial passageways 28, thus providing the valve means for releasing the stored energy, whereupon liquid is rapidly discharged to atmosphere via discharge outlet 16 in piston 14 and actuator button (not shown).

As liquid is discharged, decompression of second spring 27 forces plunger 26 downwards as shown in the drawing and the annular chamber is finally sealed to atmosphere when finger force applied to the piston stem via the actuator button is released, the piston returning to the rest position under decompression of first spring 18 and at the same time closing second radial passageways 28. Simultaneously, more liquid product is drawn into the bore 15 via non-return pressure actuable valve assembly 22 and the discharge and filling cycle can then be repeated.

It will be noted from an inspection of FIG. 1 of the drawings that at no time during the downstroke or the upstroke of the piston do the O ring seals 30 of the piston leave the confines of the bore of the cylinder. In view of this, wear of the O rings is minimal and is in any case less than would be the case if any of the O rings exited from the bore of the cylinder at any stage during actuation of the pump. It is also noted that when actuation takes place on completion of a downstroke, radial duct 17 coinciding with radial passageway 28, the lowermost O ring seal 30, which effectively seals the piston within the cylinder during a downstroke, is still in a sealing relationship with the cylinder.

Figure 2:
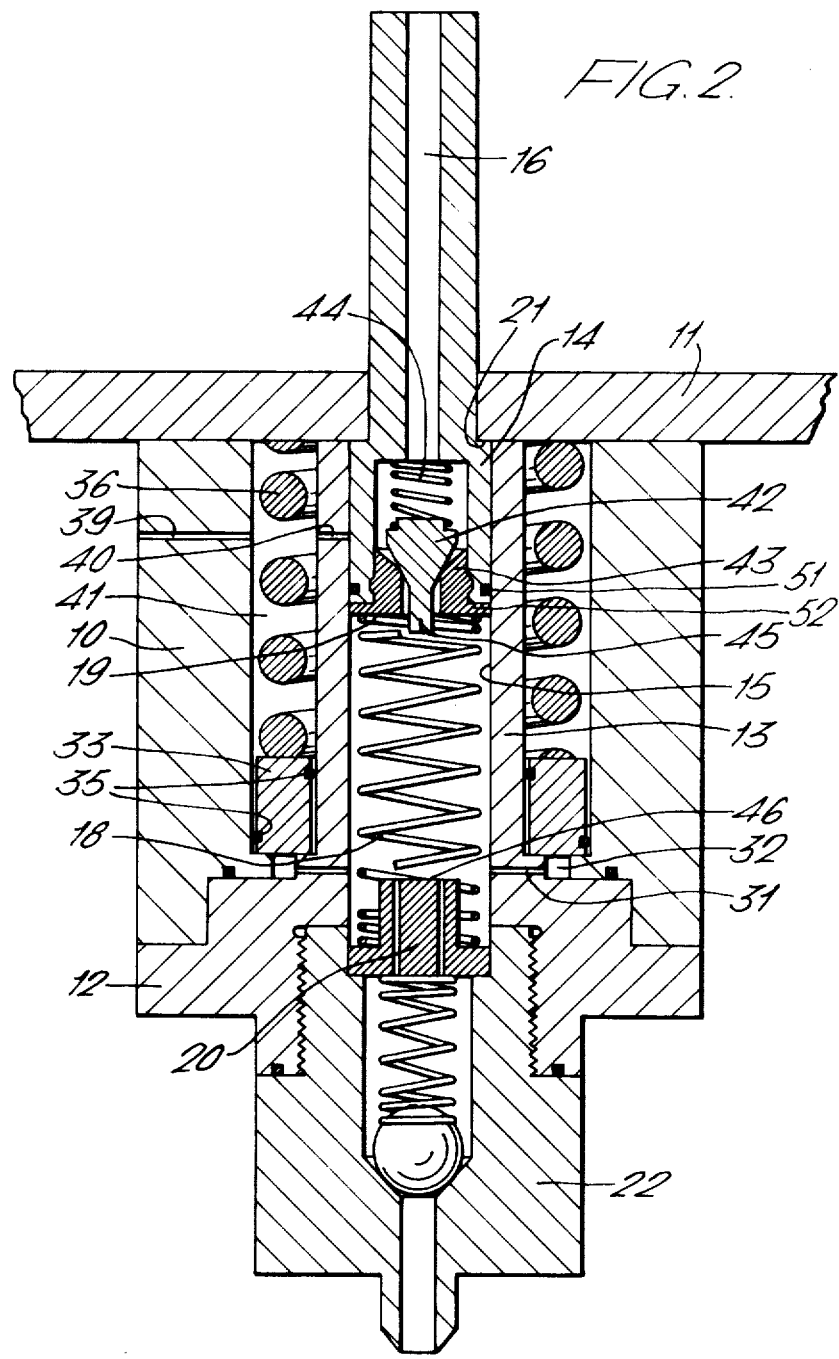
FIG. 2 is a section through a pump similar to that shown in FIG. 1 but having a spigot valve, the pump being shown at the commencement of a downstroke.
Figure 3:
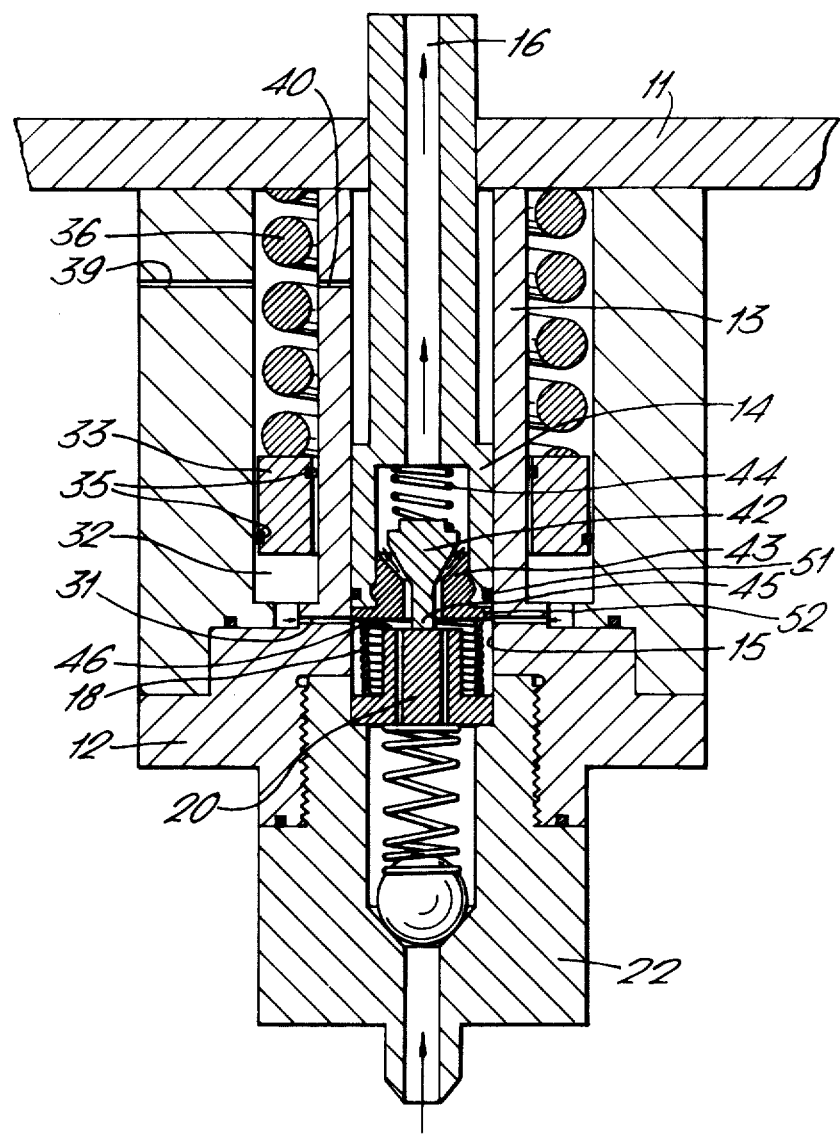
FIG. 3 is a section through a pump of the type shown in FIG. 2 at the end of a downstroke.

According to the second embodiment illustrated in FIGS. 2 and 3 of the drawings, the pump consists of a cylindrical outer body 10 closed at one end by an apertured plate 11 and at the other end by a flange 12 of pump cylinder 13, which is located co-axially within the outer body 10.

A finger-displaceable axial piston 14 is slidably located in bore 15 of pump cylinder 13, the upper end of this piston, i.e. the piston stem, passing through the apertured plate 11. The piston 14 and the cylinder 13 together define the feed chamber having a finger-displaceable end wall.

The stem of the piston 14 is hollow throughout its length, the upper end as shown in the drawings forming a discharge outlet 16. The lower end 52 of piston 14 is a snug fit within the bore 15 of the pump cylinder 13. An 'O' ring 51 fitted around the piston 14 just above the lower end 52 further ensures that the piston 14 provides a liquid tight fit within the bore 15. Fitted axially within the lower end 52 of piston 14 is a spigot valve 42 with associated seating 43, the spigot valve being biased towards the seating by spring 44 housed within the piston 14. The spigot valve constitutes the valve means for releasing energy stored in the resilient means.

The stalk 45 of spigot valve 42 normally extends below the lower end of piston 14 as shown in the FIGS. 2 and 3 of the drawings, the stalk being in axial alignment with an associated upper end 46 of spacer 20. The upper end of discharge outlet 16 in piston 14 can be closed by an actuator button (not shown).

The pump cylinder 13 also houses a piston return spring 18 abutting lower end 19 of piston 14 and upper face of apertured spacer 20. This spring biases the piston upwards as shown in the drawings so that piston shoulder 21 abuts the apertured plate 11 when the pump is in the non-actuating condition as shown in FIG. 2. The spacer 20 separates the pump cylinder 13 from a non-return pressure actuable ball valve assembly 22.

The pump cylinder 13 shown in FIGS. 2 and 3 is provided with at least one radial passageway 31 opening into annular discharge chamber 32 between outer body 10 and pump cylinder 13. It is this radial passageway, communicating the feed chamber with the discharge chamber, which provides a conduit for liquid product to pass from the feed chamber (i.e. cylinder 13) to the annular discharge chamber 32 when hydraulic pressure in the feed chamber increases.

The annular discharge chamber 32 houses an annular plunger 33 with seals 35 which is baised by a spring 36 (the resilient means for storing energy) and which can slide within the annular discharge chamber.

The wall of outer body 10 and that of pump cylinder 13 are both perforated with corresponding breathing channels 39 and 40, which communicate with each other via the upper part 41 of annular discharge chamber 32. This upper part 41 also houses the spring 36.

In use, the pump as illustrated in FIGS. 2 and 3 of the drawings is applied to the top of a container of liquid so that the non-return pressure actuable ball valve assembly is in contact with that liquid, if necessary via a diptube (not shown).

At the first downstroke of piston 14 toward the pressure actuable valve 22, the piston return spring 18 is compressed and when stalk 45 of pin valve 42 is displaced by contact with upper end 46 of spacer 20, air in bore 15 is bled via radial passageways 31, annular discharge chamber 32 to atmosphere. When piston 14 is released, liquid product is drawn up through non-return pressure actuable valve assembly 22 into cylinder bore 15. This is a priming operation and the pump is now ready for use.

At the second or subsequent downstroke of the piston 14, hydraulic pressure within cylinder bore 15 increases and liquid product is thereby caused to flow via radial passageways 31 and annular discharge chamber 32 to annular plunger 33. Further increase in hydraulic pressure on this liquid displaces the annular plunger 33 against spring 36, so that liquid flows into the annular discharge chamber 32. As plunger 33 moves, the volume of the annular discharge chamber 32 increases and accummulating energy is stored in spring 36 as it is compressed. As pressure increases still further displacement of annular plunger 33 continues in order to accommodate liquid, until the stalk 45 of spigot valve 42 contacts the upper end 46 of spacer 20. Continuation of the downstroke beyond this point unseats the spigot valve 42 and its displacement against bias of spring 44 allows liquid to pass from the annular discharge chamber 32 via radial passageways 31, cylinder bore 15 and past seating 42 to discharge outlet 16 in piston 14 and finally to atmosphere via actuator button (not shown).

As liquid is discharged, decompression of spring 36 forces annular plunger 33 downwards to the rest position. The annular discharge chamber 32 is finally sealed to atmosphere when finger pressure on the pump is released, piston 14 returning upwards to the rest position under decompression of piston return spring 18. Simultaneously, more liquid product is drawn into the cylinder bore 15 via non-return pressure actuable valve assembly 22 and the discharge and filling cycle can then be repeated.

The breathing channels 39 and 40 ensure that the gas pressure within the container to which the pump is fitted is always maintained at atmospheric pressure.

It will be noted that the embodiment shown in FIGS. 2 and 3 of the drawings differs from that illustrated in FIG. 1 of the drawings in that the radial duct 17 of FIG. 1 is replaced by the cavity within the lower end of the piston 14 as shown in FIGS. 2 and 3. Also radial passageways 28 of FIG. 1 are omitted in FIGS. 2 and 3, radial passgeways 31 serving the dual purpose of conducting liquid from cylinder to annular discharge chamber during a downstroke and from annular discharge chamber back to cylinder at the point of actuation when the spigot valve opens.

The manufacture and assembly of piston and cylinder of the embodiment shown in FIGS. 2 and 3 can thereby be simplified, especially where the parts are fabricated from plastics material.

As with the embodiment illustrated in FIG. 1 of the drawings, it will be noted that at no time during the operation of the pump does the piston leave the confines of the bore of the cylinder, thus reducing to an absolute minimum wear on the single O ring 51 which seals the piston 14 within the cylinder bore 13; also the O ring 51 seals piston 14 to the pump cylinder 13 both before and after the spigot valve operates to release liquid pressure to atmosphere.

Figure 4:
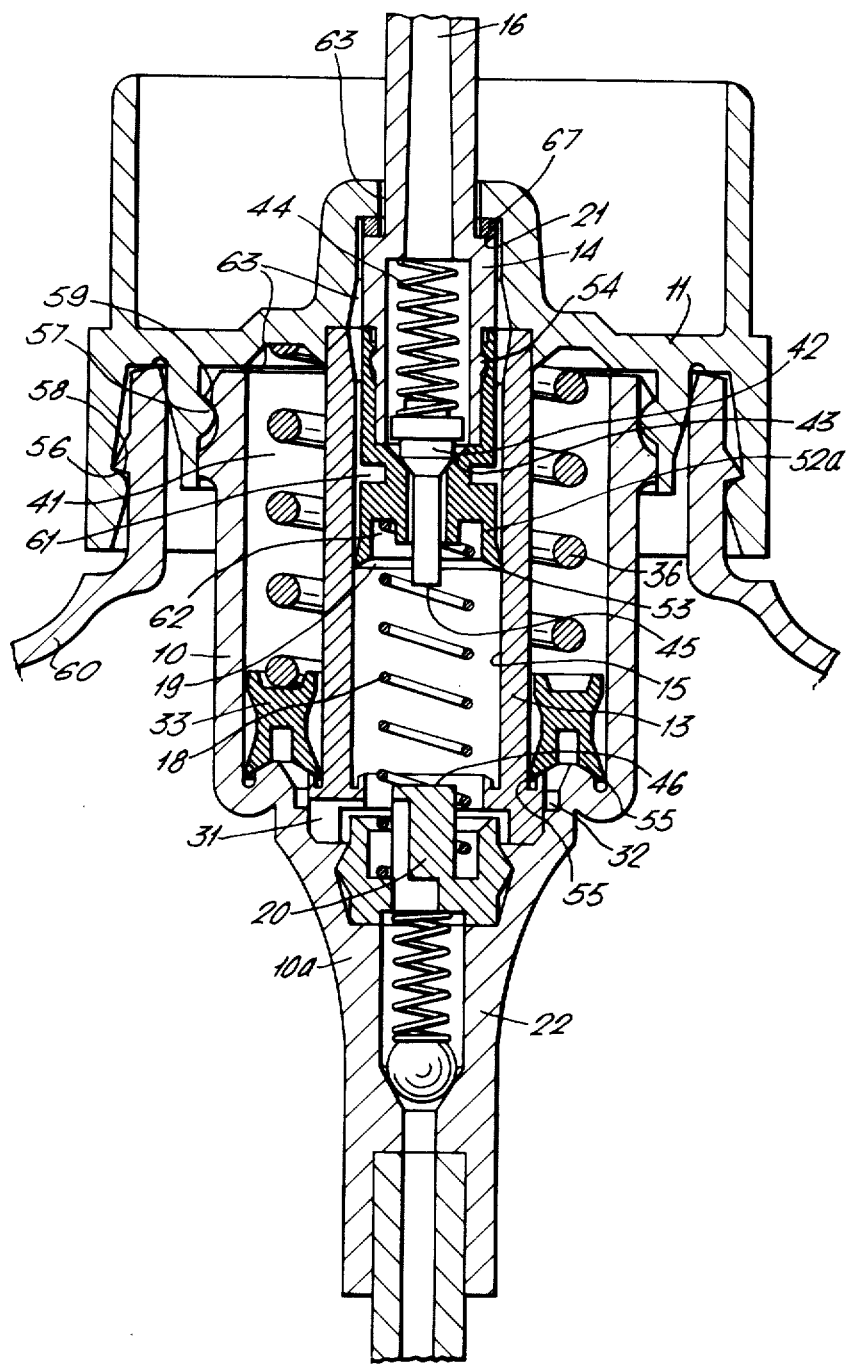
FIG. 4 is a section through a pump, in principle, similar to that shown in FIG. 2 at the commencement of a downstroke, but showing certain refinements which facilitate its construction and assembly and which improve its operation.
Figure 5:
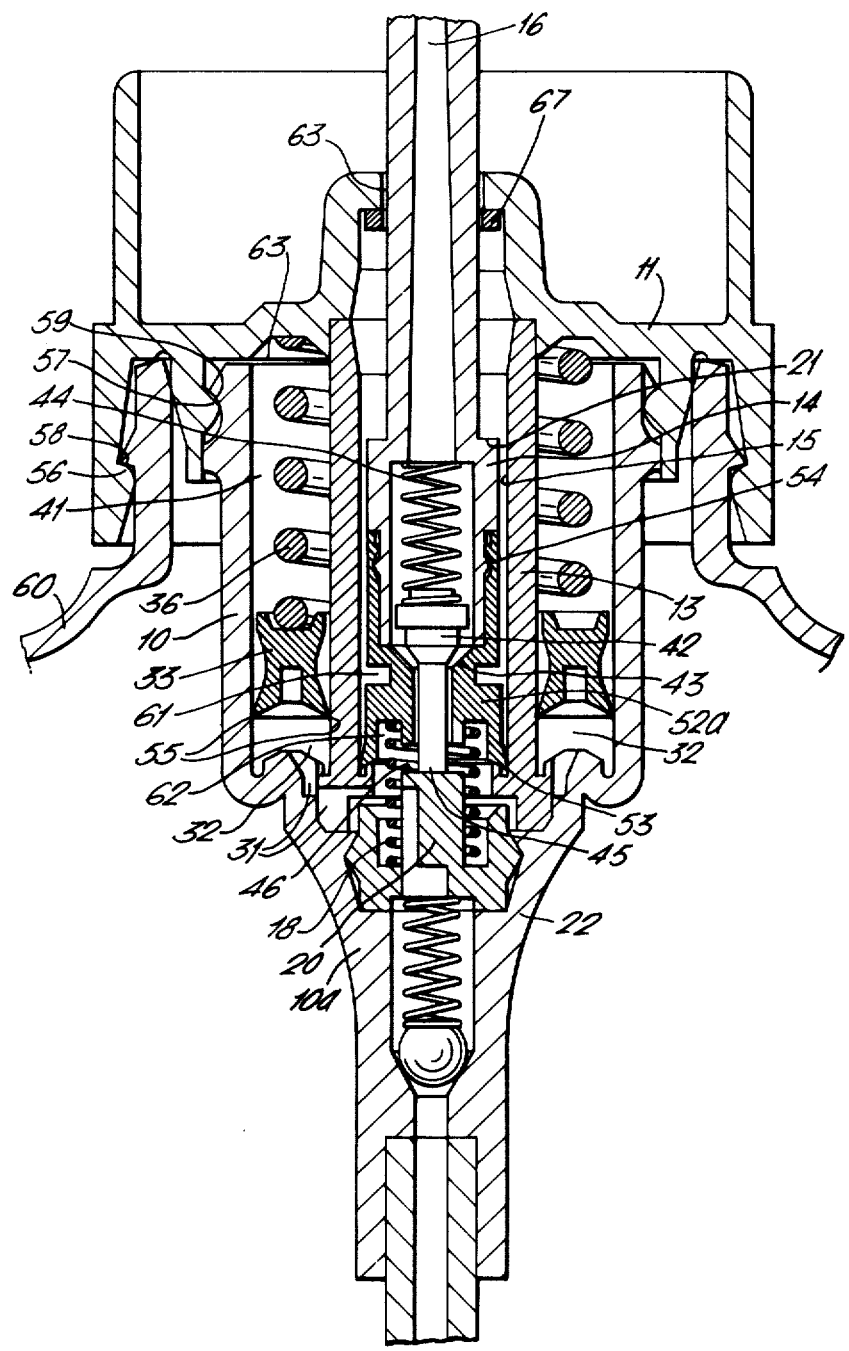
FIG. 5 is a section through a pump of the type shown in FIG. 4 at the end of a downstroke.

According to the second embodiment of the invention as illustrated in FIGS. 4 and 5 of the drawings, the pump consists of a cylindrical outer body 10 closed at its upper end by an apertured end plate 11 and conically tapered at its lower end 10a to house pump cylinder 13, spacer 20 and non-return valve assembly 22.

A finger displaceable axial piston 14 is slidably located in bore 15 within pump cylinder 13, the stem of the piston passing through the apertured plate 11. An axial feed plunger 52a with sealing lip 53 is snap fitted to the lower end of axial piston 14 via annular tang 54. An annular slot 61 and cylindrical slot 62 in the axial feed plunger 52a together ensure that the lip 53 is flexibly applied in a sealable fashion to the bore 15 of pump cylinder 13. By this means a perfect seal between cylinder and plunger can be obtained with minimum friction and minimum wear of the sealing lip 53 when in use.

Fitted within the lower hollow end of piston 14 and within axial feed plunger 52a is a spigot valve 42 with associated seating 43, the spigot valve being biased towards the seating by spring 44 housed also within the lower end of piston 14.

Figure 6:
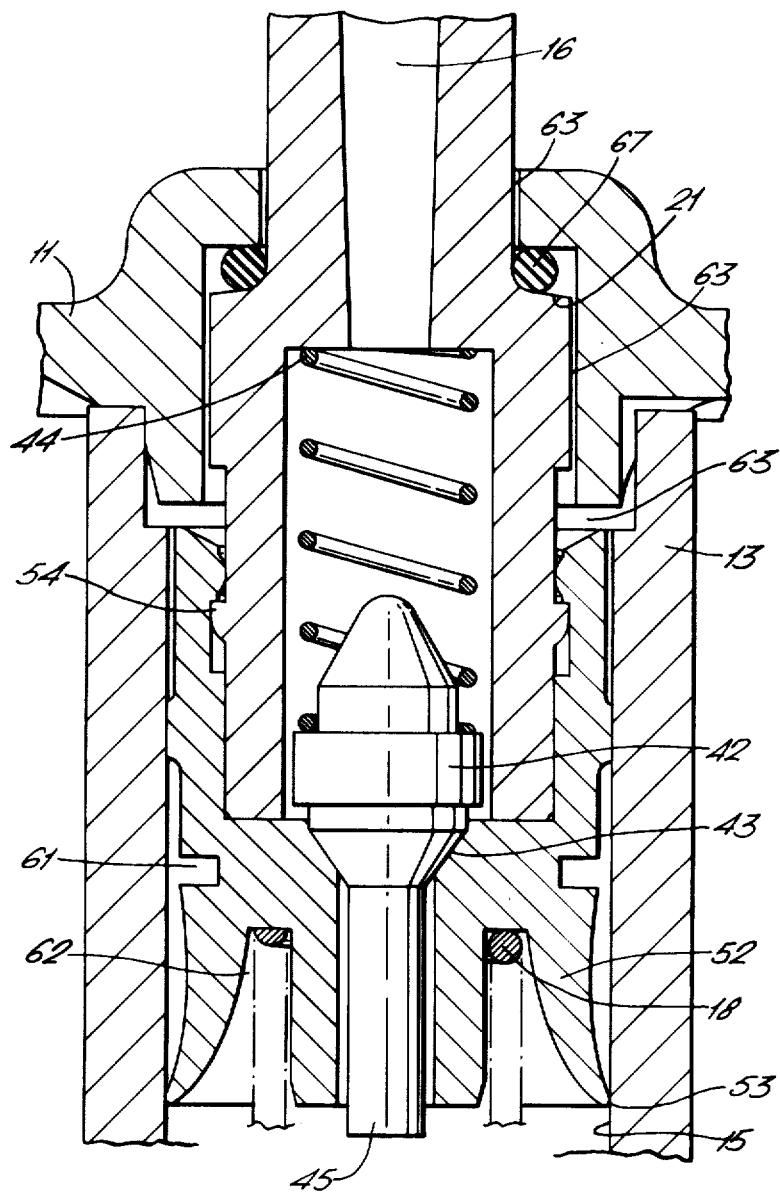
FIG. 6 is an enlarged section of part of the pump of the type illustrated in FIG. 2 to 5, showing a spigot valve and axial piston in enlarged proportions.

The spigot valve and axial feed plunger assembly is shown in greater detail in FIG. 6 of the drawings.

The stalk 45 of pin valve 42 normally extends below the lower end of axial plunger 52a as shown in th drawings, the stalk being in axial alignment with the upper end 46 of spacer 20. The upper end of discharge outlet 16 in piston 14 can be closed by an actuator button (not shown).

The pump cylinder 13 also houses a piston return spring 18 abutting lower end 19 of piston 14 and apertured spacer 20. This spring biases the piston upwards as shown in FIG. 4 of the drawings, so that piston shoulder 21 forms a seal against washer 67 mounted within apertured end plate 11 when the pump is in the non-actuating condition. The spacer 20 separates the pump cylinder 13 from a non-return valve assembly 22.

The pump cylinder 13 shown in FIGS. 4 and 5 of the drawings is provided with radial passageways 31 (only one of which is shown) communicating the bore 15 of pump cylinder 13 with an annular discharge chamber 32 defined by the outer body 10 and the pump cylinder 13. The annular discharge chamber 32 houses an annular plunger 33 with sealing lips 55 which is biased by a spring 36 (the spring for storing strain energy). This spring is housed within annular cavity 41 also defined by outer body 10 and pump cylinder 13. This annular cavity thus forms an extension of the annular discharge chamber.

The apertured plate 11 is provided with annular lips 56 and 57 for facilitating a snap-fit with annular lip 58 of the neck 60 of a container (not shown) and annular lip 59 of the outer body 10 respectively. It will be noted that the four annular lips 56, 58, 57 and 59 togehter co-operated to form a secure snap-fit of the three parts constituted by the neck 60 of the container, the apertured plate 11 and the outer body 10.

The annular lips 57 and 59 are interrupted at one point (not shown) to provide communication between the inside of the container to which the pump dispenser is fitted and the atmosphere via labarynthine passageway 63 defined by apertured plate 11, outer body 10 and outer wall of piston 14 above the axial plunger. This passageway 63 is sealed by elastomeric washer 67 when the pump dispenser is in a non-actuating condition as shown in FIG. 4 of the drawings.

FIG. 6 shows the arrangement of spigot valve and piston in greater detail.

In use, the pump as illustrated in FIGS. 4 and 5 of the drawings operates in a manner similar to that described for the pump illustrated in FIGS. 2 and 3 of the drawings.

The component parts of the pump dispenser illustrated in FIGS. 4, 5 and 6 of the drawings except for the springs can be moulded from flexible plastics material. For example, the apertured plate 11, outer body 10, 10a, pump cylinder 13 and piston 14 can each be moulded from high density polypropylene while the axial plunger 52, annular plunger 33 and spacer 20 can be moulded from low density polyethylene. By using materials such as these, manufacture and assembly of the component parts on mass production scale can be facilitated.

Figure 7:
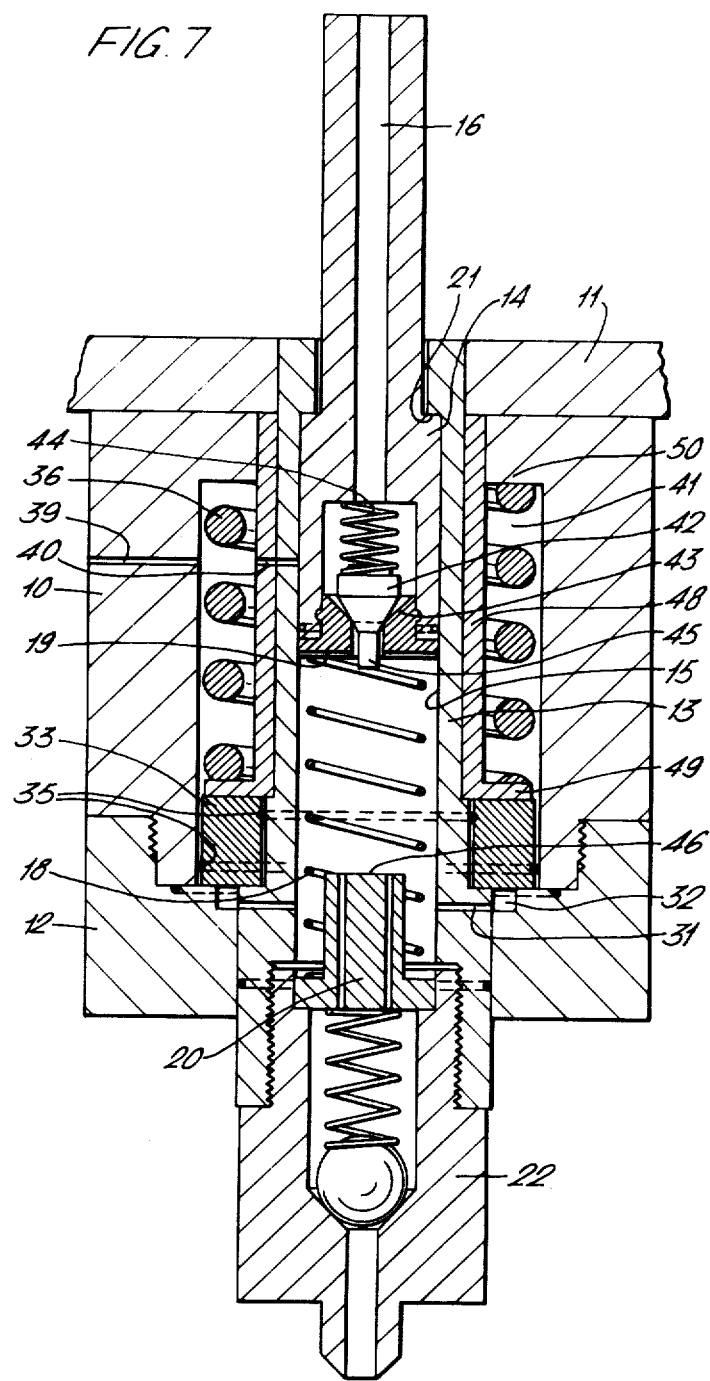
FIG. 7 is a section through a pump dispenser similar to that illustrated in FIGS. 2 and 3 in a non-actuating condition at the commencement of a downstroke, except that the plunger is in a fixed relationship with the apertured plate, the outer body being free to move when the pump is actuated.
Figure 8:
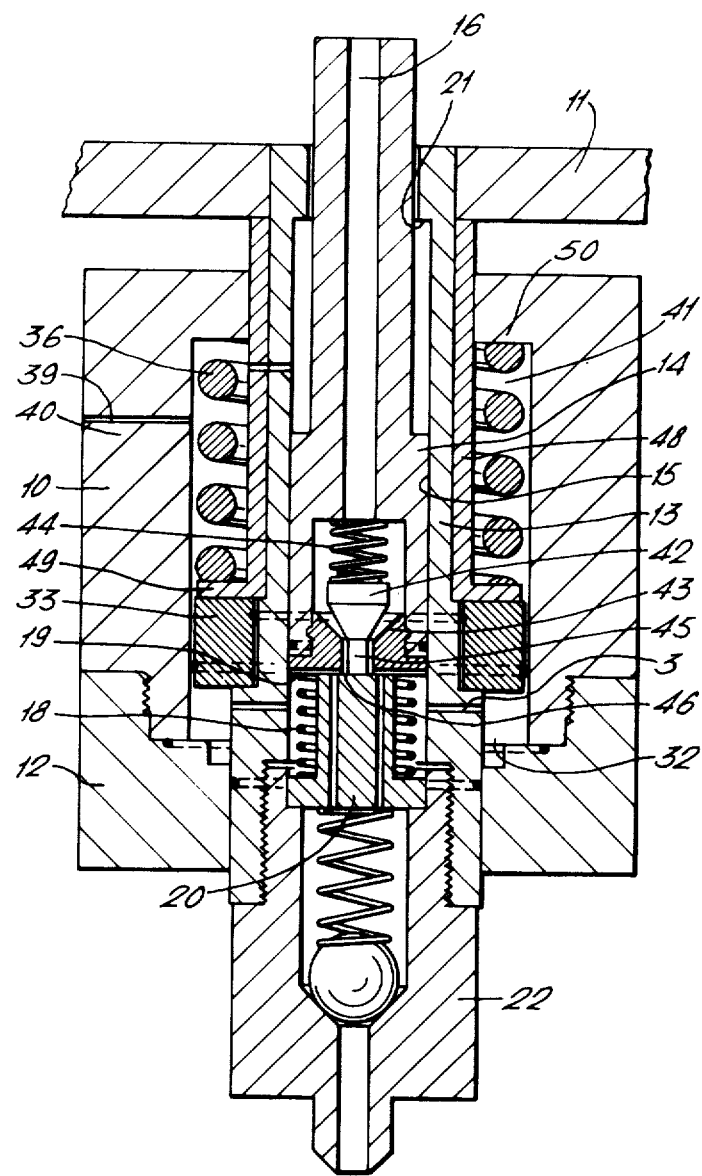
FIG. 8 is a section through a pump dispenser of the type shown in FIG. 7 in an actuating condition at the end of the downstroke.

According to the third embodiment illustrated in FIGS. 7 and 8 of the drawings, the pump consists of a cylindrical outer body 10 mounted between a first apertured plate 11 at the upper end and a second apertured plate 12 at the lower end. Integral with the first apertured plate 11 and axially dependant from it is pump cylinder 13 together with surrounding cylindrical guide member 48.

The cylindrical outer body 10 is integral with the second apertured plate 12 and together they are arranged to slide axially over the cylindrical guide member 48 and pump cylinder 13.

A finger displaceable axial piston 14 is slidably located in bore 15 within the pump cylinder 13, the stem of the piston passing through the first apertued plate 11. The piston 14 and the cylinder 13 together defining the feed chamber having a finger displaceable end wall. The stem of the piston as shown in FIGS. 7 and 8 of the drawings is hollow and forms a discharge outlet 16. Fitted within the lower hollow end of piston 14 is a spigot valve 42 with associated seating 43, the spigot valve being biased towards the seating by spring 44 housed within the lower end of piston 14. The hollow stem of the piston and the lower hollow end of the piston together form a discharge conduit, while the spigot valve itself constitutes the valve means for releasing energy stored in the resilient means.

The stalk 45 of spigot valve 42 normally extends below the lower end of piston 14 as shown in FIG. 7 of the drawings, the stalk being in axial alignment with upper end 46 of spacer 20.

The upper end of discharge outlet 16 in piston 14 can be closed by an actuator button (not shown).

The pump cylinder 13 also houses a piston return spring 18 abutting lower end 19 of piston 14 and spacer 20. This spring biases the piston upwards as shown in the drawings so that piston shoulder 21 abuts first apertured plate 11 when the pump is in the non-actuating condition as shown in FIG. 7. The spacer 20 separates the pump cylinder 13 from the non-return ball valve assembly 22.

The pump cylinder 13 shown in FIGS. 7 and 8 of the drawings is provided with at least one radial passageway 31 opening into annular discharge chamber 32 between outer body 10 together with integral second apertured plate 12 and pump cylinder 13.

It is this radial passageway, communicating the feed chamber with the discharge chamber, which provides a conduit for liquid product to pass from the feed chamber (i.e. cylinder 13) to the annular discharge chamber 32 when hydraulic pressure in the feed chamber increases.

The annular discharge chamber 32 houses an annular piston 33, with seals 35 which is fixed in relation to pump cylinder 13 and cylindrical guide member 48.

The cylindrical guide member 48 and the outer body 10 each have a flange 49 and 50 which are biased apart by a spring 36 (the spring for storing strain energy). This spring is thus housed in annular cavity 41 defined by the outer body 10, cylindrical guide member 48 and their respective flanges 50 and 49. This annular cavity 41 thus forms an extension of the annular discharge chamber 32.

The wall of outer body 10 and that of pump cylinder 13 are both perforated with corresponding breathing channels 39 and 40 which communicate via the annular cavity 41.

In use, the pump illustrated in FIGS. 7 and 8 of the drawings is applied to the top of a container of liquid so that the non-return valve assembly is in contact with that liquid, if necessary via a dip-tube (not shown).

At the first downstroke of piston 14, the piston return spring 18 is compressed and air in bore 15 is temporarily forced via radial passgeways 31 into annular chamber 32, and is then released to atmosphere, when stalk 45 of spigot valve 42 is displaced by contact with upper end 46 of spacer 20. When piston 14 is released, the spigot valve closes and liquid is drawn up through non-return valve assembly 22 into cylinder bore 15. This is a priming operating and the pump dispenser is now ready for use.

At the second downstroke of the piston 14, the hydraulic pressure on liquid within cylinder bore 15 increases and liquid is thereby caused to flow via radial passageways 31 into annular discharge chamber 32. Unlike the embodiments illustrated in FIGS. 2 and 3, the annular piston 33 of the embodiment illustrated in FIGS. 7 and 8 of the drawings is fixed in relation to pump cylinder 13 and therefore further increase in pressure on this liquid displaces outer body 10 together with integral second apertured plate 12 slidably downwards in relation to the pump cylinder 13 thereby to accommodate the liquid in the inceased volume of annular discharge chamber 32. As the volume of this chamber increases, accumulating energy is stored in spring 36 as it is compressed with annular cavity 41.

As hydraulic pressure increases still further, displacement of outer body 10 and second apertured plate 12 continues to increase in order to accommodate more liquid, until stalk 45 of spigot valve 42 contacts the upper end 46 of spacer 20. Continuation of the downstroke beyond this point unseats the spigot valve 42 and its displacement against bias of spring 44 allows liquid to pass from the annular chamber 32 via radial passageways 31, cylinder bore 15 and past seating 43, to discharge outlet 16 in piston 14 and finally to atmosphere via acutator button (not shown). The discharge attitude of the pump dispenser is shown in FIG. 8 of the drawings.

As liquid is discharged, decompression of spring 36 biases apart flanges 49 and 50 so that outer body 10 together with second apertured plate 11 return slidably to the rest position as shown in FIG. 7 of the drawings. The annular discharge chamber 32 is finally sealed when finger pressure on the pump dispenser is released, the spigot valve 42 closing and the piston 14 returning to the rest position under decompression of piston return spring 18. Simultaneously, more liquid product is drawn into the cylinder bore 15 via non-return ball valve assembly 22 and the discharge and filling cycle can then be repeated.

It will be noted that the relationship between the sealing action of the piston on the cylinder and the operation of the spigot valve is similar to that described with reference to FIGS. 2-6.

Figure 9:
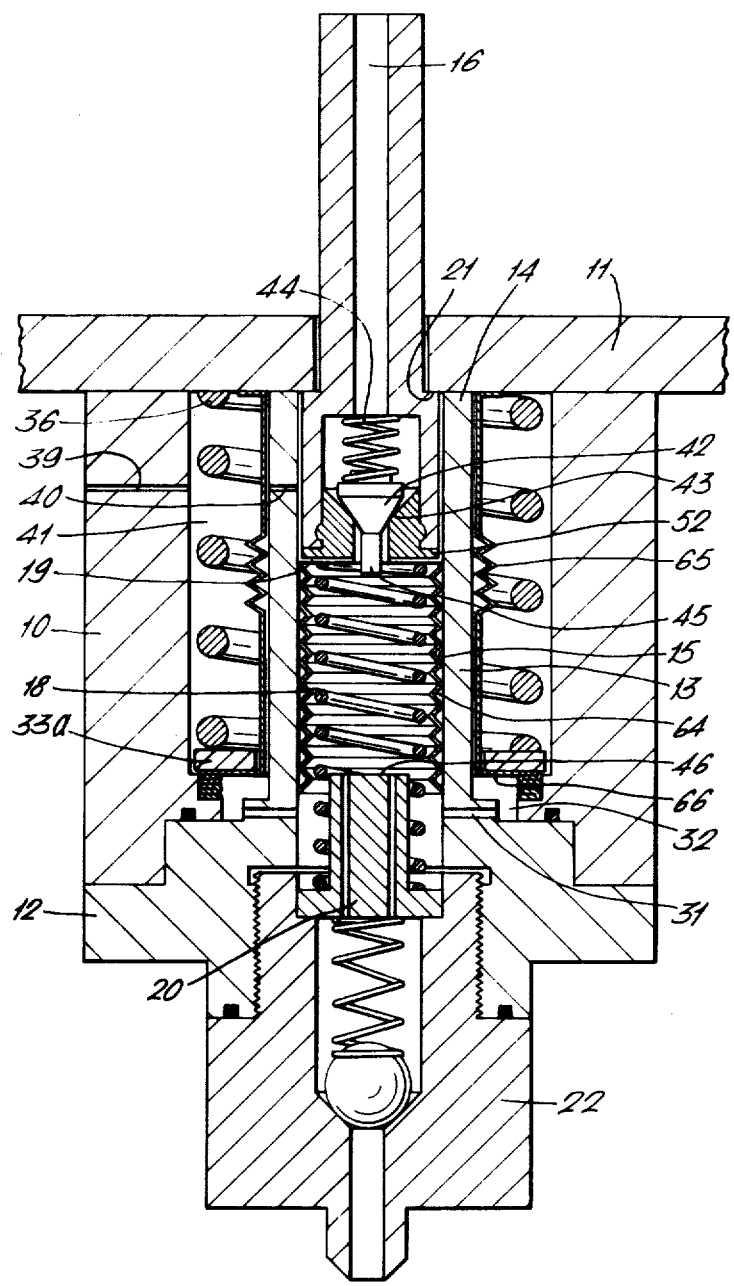
FIG. 9 is a section through a pump similar to that illustrated in FIGS. 2 and 3, except that the function of both the axial piston and plunger have been replaced by bellows. The pump in FIG. 9 is shown in a non-actuating condition.
Figure 10:
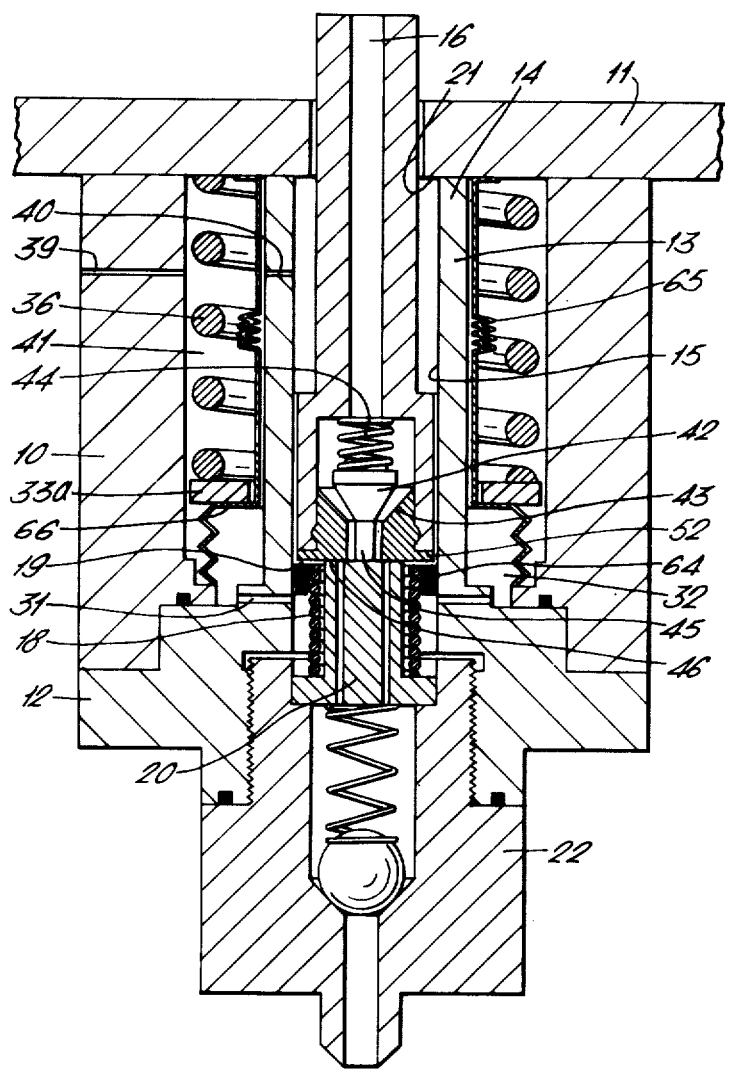
FIG. 10 is a section through a pump similar to that illustrated in FIG. 9 in an actuating condition.

According to the fourth embodiment of the invention as illustrated in FIG. 9 and 10 of the drawings, the pump consists of a cylindrical outer body 10 closed at the upper end by an apertured plate 11, and at the lower end by a flange 12 of pump cylinder 13, which is located concentrically within the outer body 10.

A finger displaceable axial piston 14 is slidably located in a bore 15 within the pump cylinder 13, the piston passing through the apertured plate 11. The stem of the piston 14 is hollow throughout its length, the upper end as shown in the drawings forming a discharge outlet 16.

An axial plunger 52 is fitted to the lower end of piston 14; both axial plunger and piston are loosely slidable within the bore 15 of the pump cylinder and do not form a snug liquid tight fit as do the corresponding parts of the pump as illustrated in FIGS. 2 and 3 of the drawings. Attached between the lower face 19 of the axial plunger 52 and the side wall of the bore 15 at a point above a radial passageway 32 which penetrates the pump cylinder 13 is an axial bellows 64. The axial bellows 64 is shown in an extended state in FIG. 9 and in a collapsed state in FIG. 10 and serves to provide the feed chamber, the axial plunger 52 forming the finger displaceable end wall of the feed chamber. The axial bellows 64 and the axial plunger are inseparably united in a liquid tight fashion. This bellows thus serves the same function as the cavity defined by the bore 15 and the liquid-tight fitting axial piston 14 of the embodiment shown in FIGS. 2 and 3 of the drawings, but with advantage it provides, as shown in the embodiment illustrated in FIGS. 9 and 10 for a virtually friction free sliding movement of axial piston 14 and axial plunger 52 within bore 15.

Fitted within the lower hollow end of piston 14 and penertrating axial plunger 52 is a spigot valve 42 with associated seating 43, the spigot valve being biased towards the seating by spring 44 also housed within the lower end of piston 14. The spigot valve constitutes the valve means for releasing energy stored in the resilient means.

The stalk 45 of spigot valve 42 normally extends below the lower end of piston 14 as shown in the drawings, the stalk being in axial alignment with upper end 46 of spacer 20. The upper end of discharge outlet 16 is piston 14 can be closed by an actuator button (not shown).

The pump cylinder 13 also houses a piston return spring 18 abutting lower end 19 of piston 14 and upper face of apertured spacer 20 and situated within the axial bellows 64. This spring biases the piston upwards as shown in FIG. 9 of the drawings so that piston shoulder 21 abuts the apertured plate 11 when the pump is in the non-actuating condition shown in FIG. 9. The same spring also biases the cylindrical bellows 64 towards its fully open position. The spacer 20 separates the pump cylinder 13 from a non-return ball valve assembly 22.

The radial passageways 31 of pump cylinder 13 connect both the bore 15 and the interior of the axial bellows 64 with an annular chamber 32a bounded by outer body 10 and pump cylinder 13, thereby providing a conduit for liquid product to pass between the feed chamber (i.e. axial bellows 64) and the annular chamber 32a.

The annular chamber 32a houses a loose fitting annular disc 33a which is biased against a spring 36 (the spring for storing strain energy), itself housed in upper part 41 of the cylindrical cavity enclosed between outer body 10 and pump cylinder 13 together with apertured plate 11.

Also housed within this upper part 41 and extending into annular chamber 32a is an annular bellows 65 (the axial discharge chamber), the upper portion of which (within the upper part 41) is of smaller diameter than the lower portion (within the chamber 32). This annular bellows thus appears stepped when viewed in longitudinal section as shown in FIGS. 9 and 10, the intermediate face 66 bearing against the annular disc 33a.

The wall of outer body 10 and that of pump cylinder 13 are both perforated with corresponding breathing channels 39 and 40, which communicate via the upper part 41 of annular chamber 32a.

In use, the pump as illustrated in FIGS. 9 and 10 of the drawings is applied to the top of a container of liquid so that the non-return pressure actuable ball valve assembly is in contact with that liquid, if necessary via a dip-tube (not shown).

At the first downstroke of piston 14 the piston return spring 18 is compressed together with axial bellows 64 and air in bore 15 is temporarily forced via radial passageways 31 into annular bellows 65 within annular chamber 32a, and is then released to atmosphere, when the stalk 45 of spigot valve 42 is displaced by contact with upper end 46 of spacer 20. When piston 14 is released, liquid is drawn up through non-return valve assembly 22 into the axial bellows 64 within cylinder bore 15. This is a priming operation and the pump is now ready for use.

At the second downstroke of the piston 14, the axial bellows 64 is compressed and the liquid within it under increasing hydraulic pressure is thereby caused to flow via radial passageways 31 into the lower portion of the annular bellows 65 within annular chamber 32a. A further increase in pressure of this liquid extends the lower portion of the annular bellows 65 so that its upper face 66 displaces the annular disc 33a against spring 36. More liquid then flows into the annular chamber within the lower end of the annular bellows. As annular disc 33 moves with the expanding volume of this lower part of the second bellows, accummulating energy is stored in spring 36 as it is compressed. As hydraulic pressure increases still further, displacement of annular disc 33a continues to increase in order to accommodate liquid, until the stalk 45 of pin valve 42 contacts the upper end 46 of spacer 20. Continuation of the downstroke beyond this point unseats the spigot valve 42 and its displacement against bias of spring 44 allows liquid product to pass from the lower end of the annular bellows 65 within the annular chamber 32a via radial passageways 31, collapsed axial bellows 64 within cylinder bore 15 and past seating 43, to discharge outlet 16 in piston 14 and finally to atmosphere via actuator button (not shown).

As liquid is discharged, decompression of spring 36 forces annular disc 33 to the rest position the upper (narrower) portion of the annular bellows being extended and the lower (wider) portion being compressed. The annular chamber 32a with its contained annular bellows is finally sealed when finger pressure on the pump dispenser is released, spigot valve 42 closing and piston 14 returning to the rest position under decompression of piston return spring 18. Simultaneously, more liquid product is drawn into the axial bellows within cylinder bore 15 via non-return valve assembly 22 and the discharge and filling cycle can then be repeated.

Figure 11:
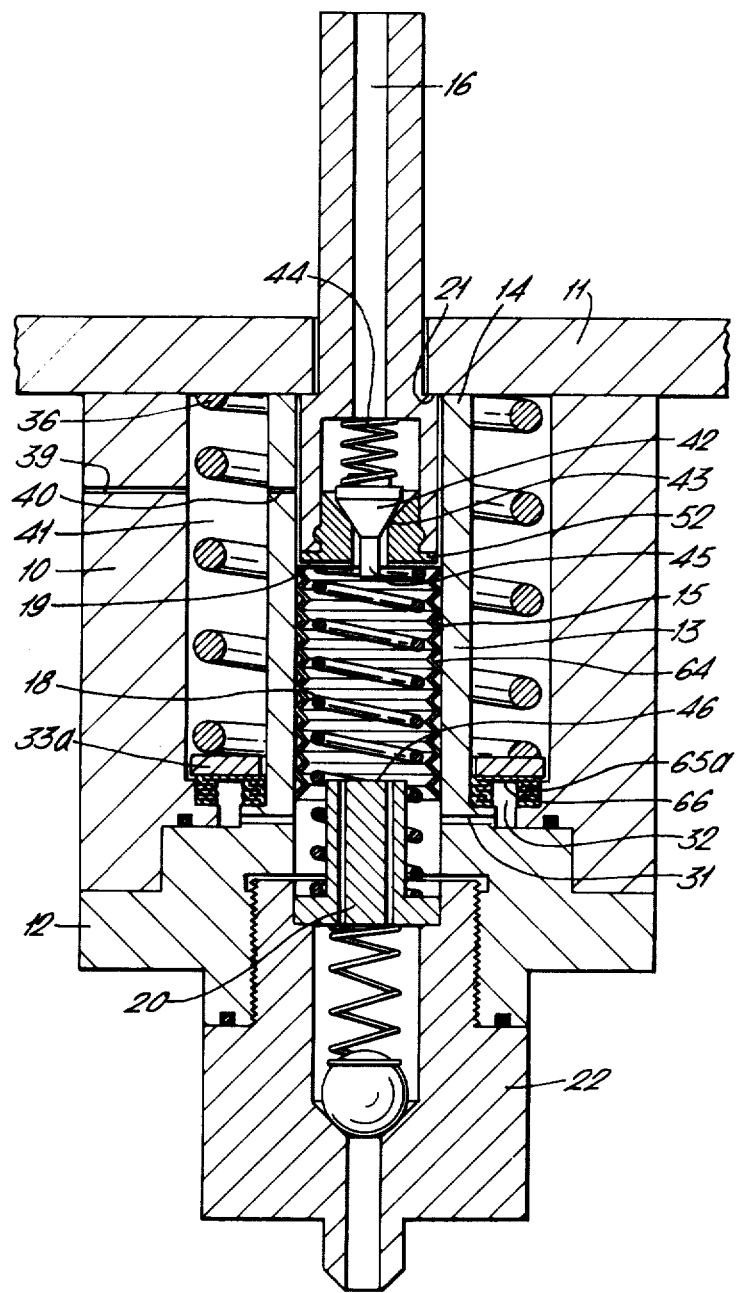
FIG. 11 is a section through a pump similar to that illustrated in FIGS. 2 and 3, except that the function of the plunger has been replaced by bellows. The pump in FIG. 11 is shown in a non-actuating condition.
Figure 12:
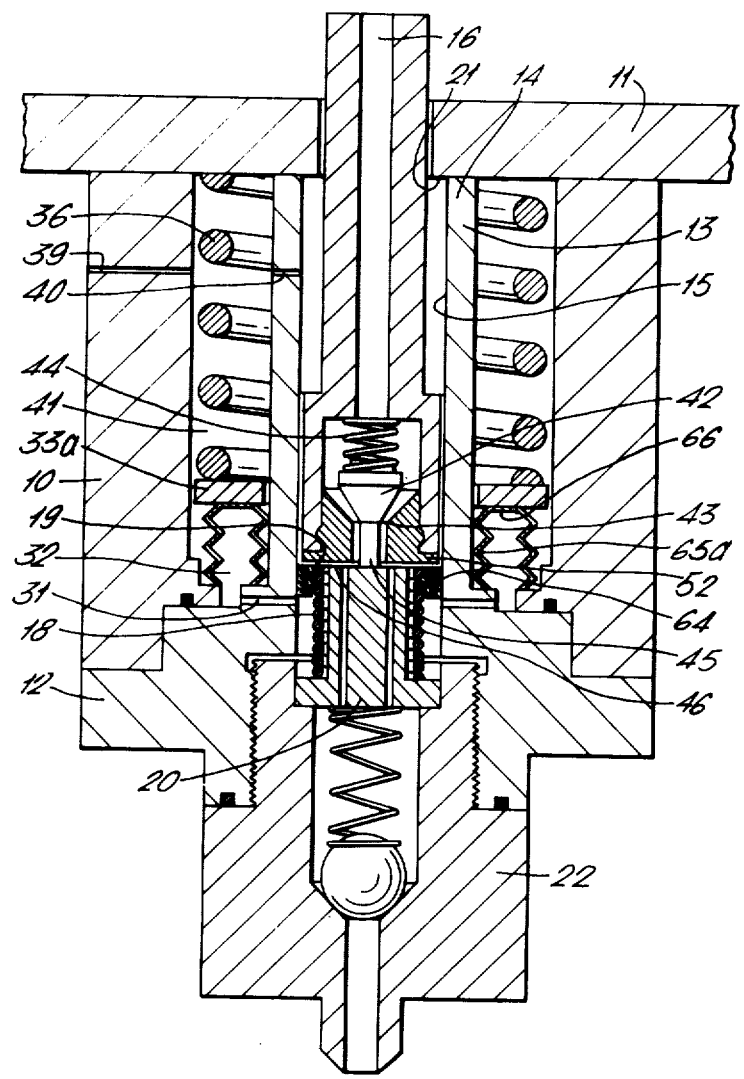
FIG. 12 is a section through a pump similar to that illustrated in FIG. 11 in an actuating condition.

According to the fourth embodiment of the invention as illustrated in FIGS. 11 and 12, the annular bellows having a stepped configuration with a wide diameter portion and a narrow diameter portion can be replaced with a double cylindrical bellows 65a having an outer cylindrical wall of similar dimensions and configuration to the lower portion illustrated in FIGS. 9 and 10 of the drawings but having an inner cylindrical wall of similar height to the outer wall. The outer and inner walls of the annular bellows of the embodiment illustrated in FIGS. 11 and 12 thus lie against the respective inner and outer walls of the annular chamber 32a and are bridged by an annular end wall to form a sealed deformable compartment within the annular chamber 32a adapted to receive liquid under pressure during an actuation sequence. This latter modification to the annular bellows is illustrated in FIGS. 11 and 12 of the drawings which in all other respects are similar to FIGS. 9 and 10.

Figure 13:
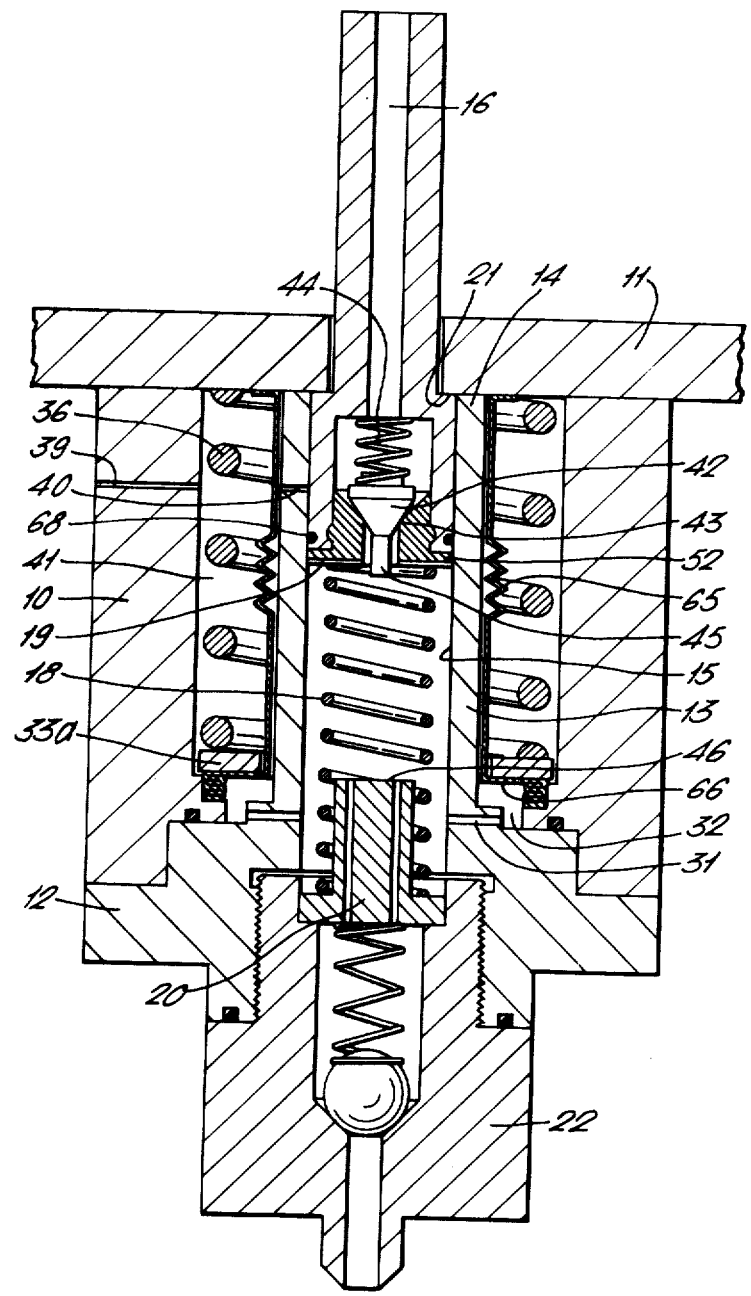
FIG. 13 is a section through a pump similar to that illustrated in FIG. 11 in a non-actuating condition.
Figure 14:
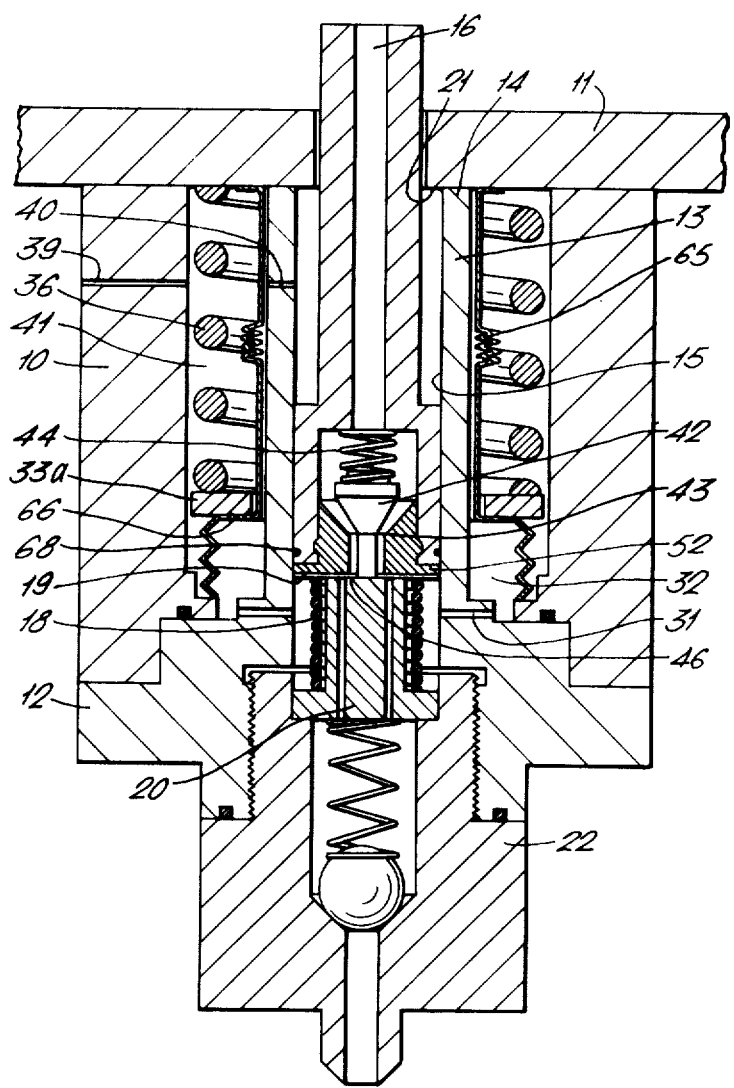
FIG. 14 is a section through a pump similar to that illustrated in FIG. 13 in an actuating condition.

Further modification of the embodiments illustrated in FIGS. 9 to 12 of the drawings can be incorporated without substantial loss of efficiency of operation. For example, as illustrated in FIGS. 13 and 14, the axial bellows 64 can be omitted and the axial plunger 52 attached to piston 14 made a liquid tight fit within cylinder bore 15 with an O ring seal 68 in the manner illustrated in FIGS. 2 and 3 of the drawings. In this example, the annular bellows 65 can either take the stepped configuration as illustrated in FIGS. 13 and 14 or they can take the double annular configuration as illustrated in FIGS. 11 and 12.

Figure 15:
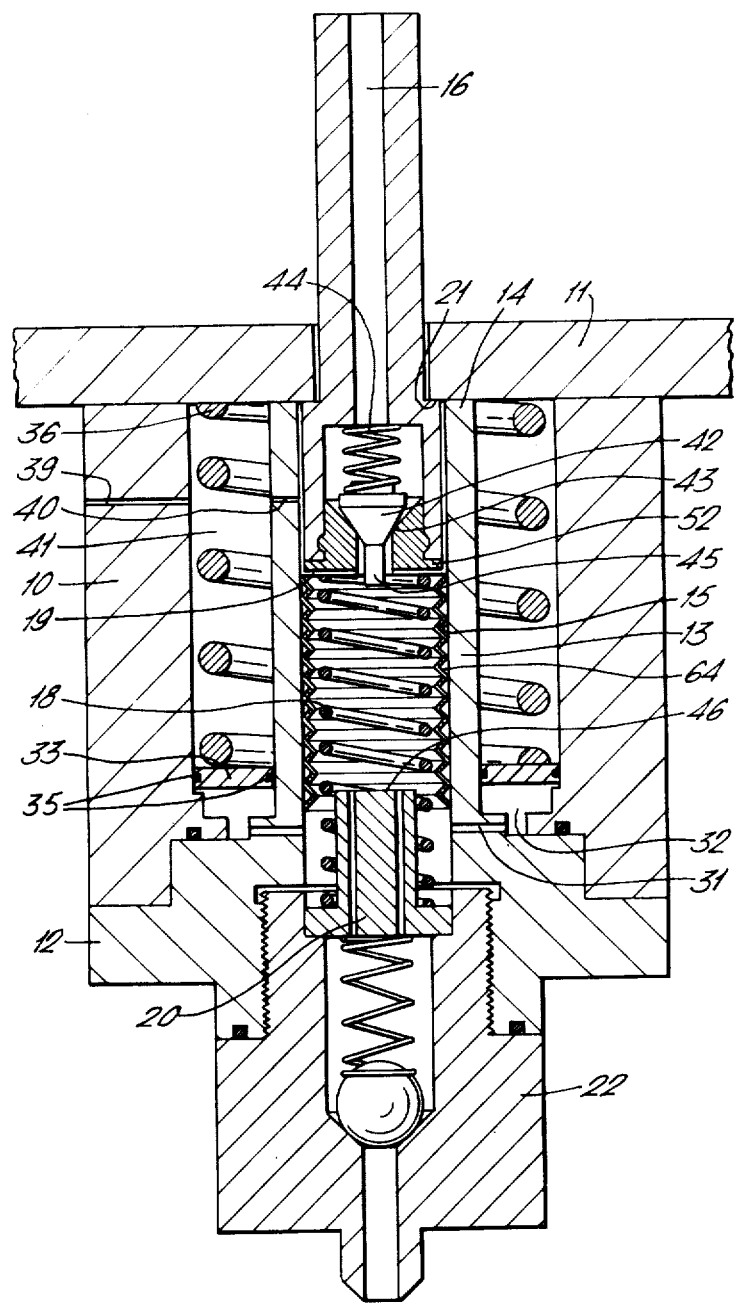
FIG. 15 is a section through a pump similar to that illustrated in FIGS. 2 and 3, except that the function of the axial piston has been replaced by bellows. The pump in FIG. 15 is shown in a non-actuating condition.
Figure 16:
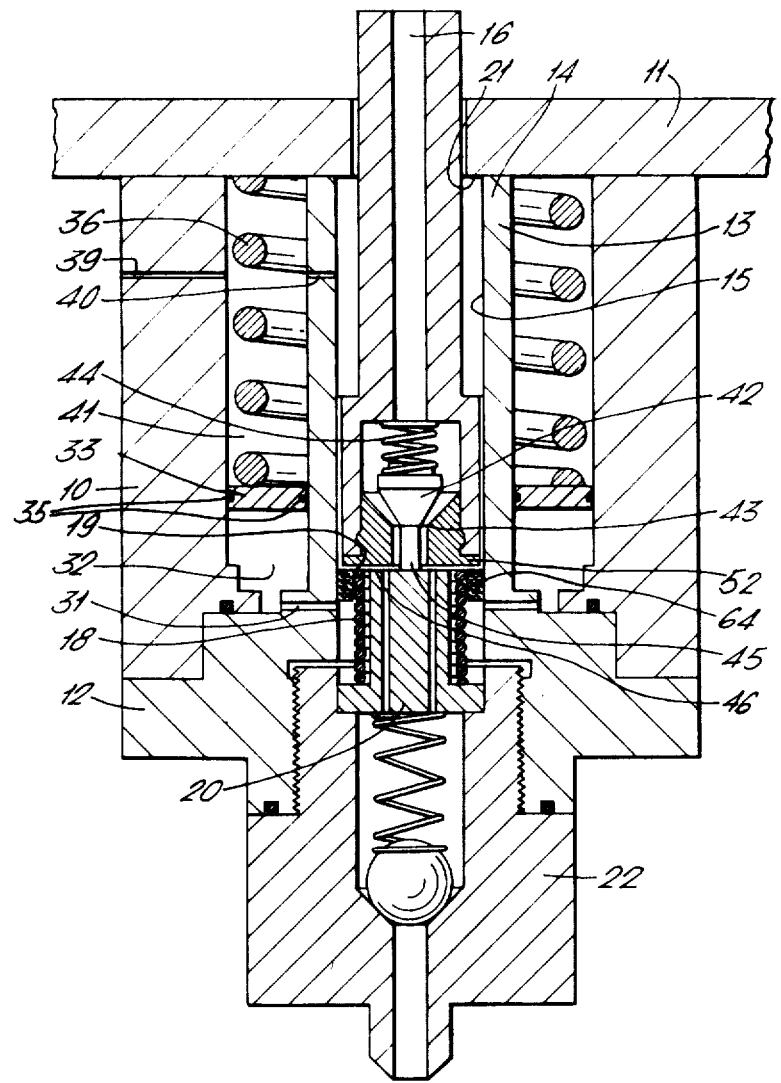
FIG. 16 is a section through a pump similar to that illustrated in FIG. 15 in an actuating condition.

Alternatively, as illustrated in FIGS. 15 and 16, the annular bellows 65 and 65a can be omitted and the annular plunger 33 made a liquid tight fit within the annular chamber 32, for example with O ring seals 35, in the manner illustrated in FIGS. 2 and 3 of the drawings.

Figure 17:
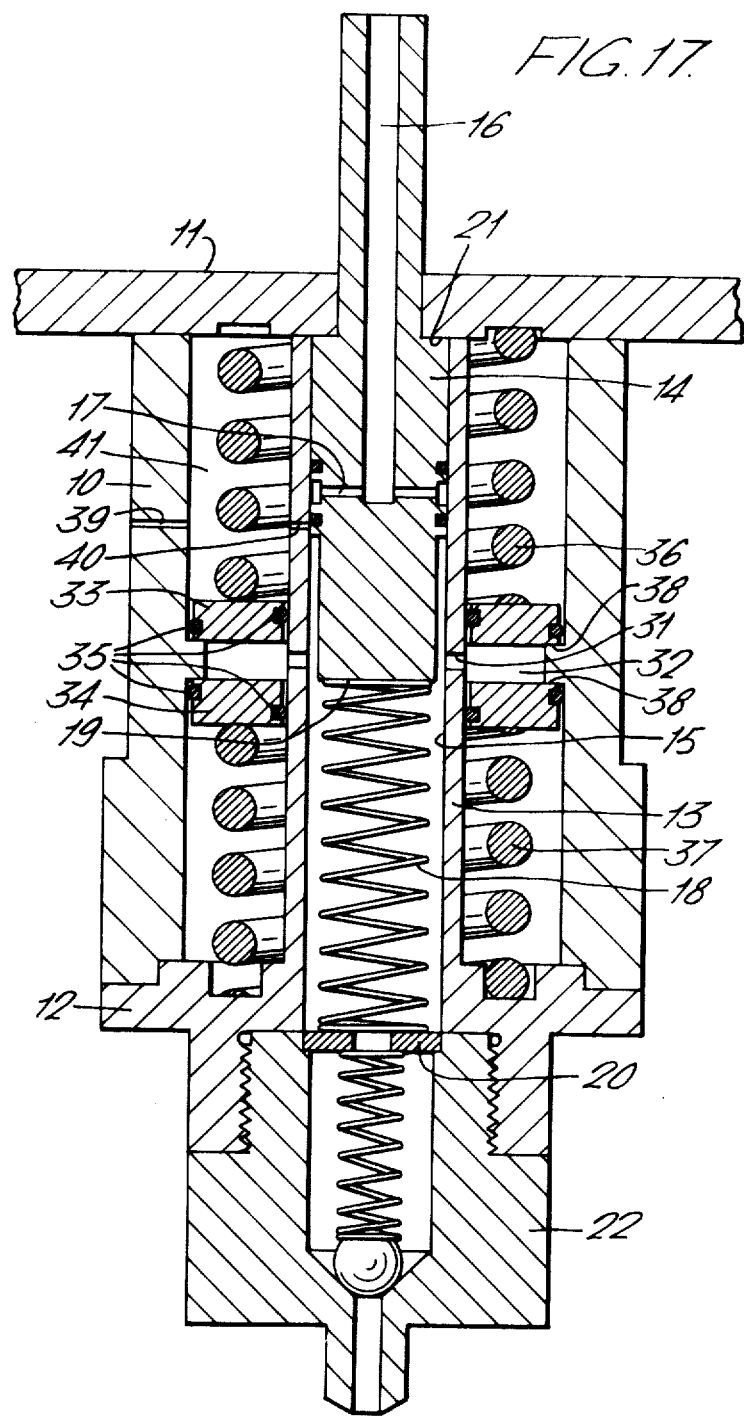
FIG. 17 is a section through a pump similar to that illustrated in FIG. 1, except that a second plunger and spring have been added within the annular discharge chamber. The pump in FIG. 17 is shown in a non-actuating condition at the commencement of a downstroke.
Figure 18:
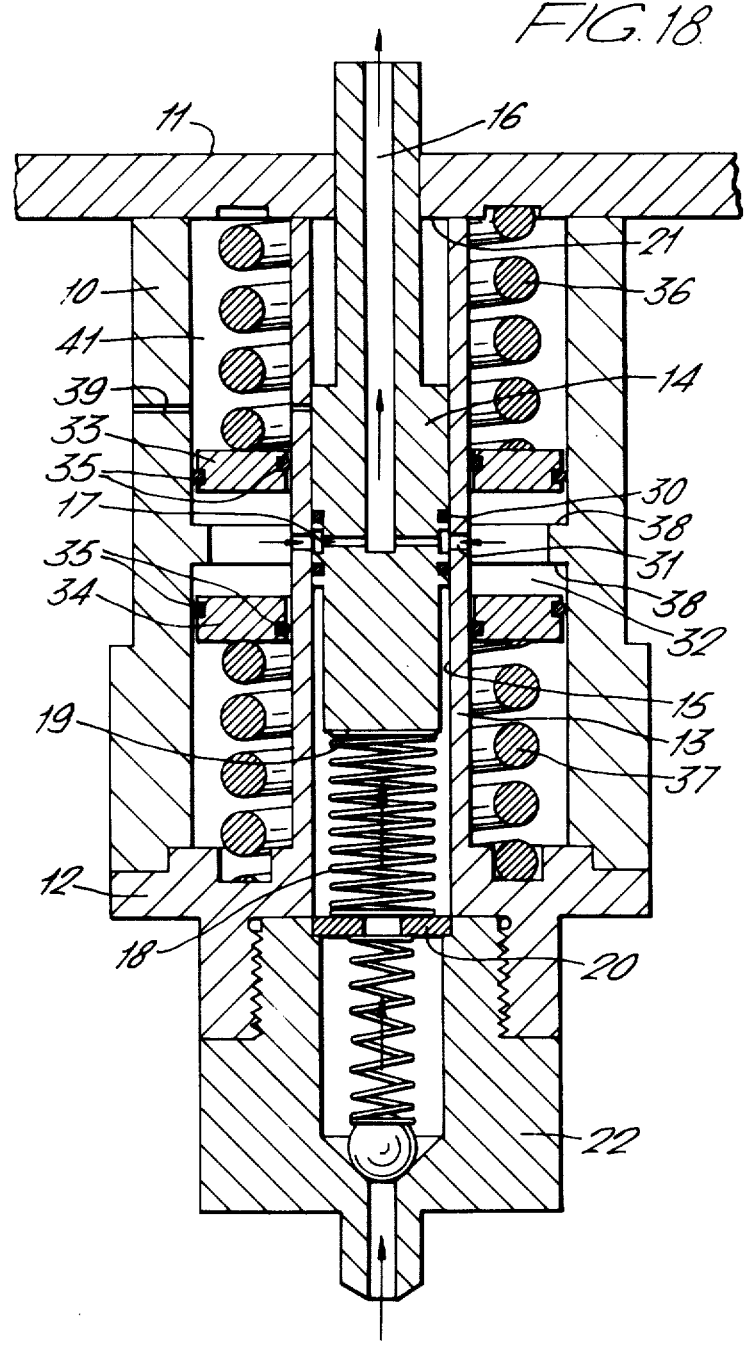
FIG. 18 is a section through a pump of the type shown in FIG. 17 in a actuating condition at the termination of a downstroke.

According to the fifth embodiment of the invention as illustrated in FIGS. 17 and 18 of the drawings, the pump consists of an outer body 10 containing a pump cylinder 13 with piston 14 and associated features generally as described with reference to FIG. 1 of the drawings.

In FIGS. 17 and 18, however, pump cylinder 13 is provided with radial passageways 31 opening into annular discharge chamber 32 beteen outer body 10 and pump cylinder 13. The annular discharge chamber 32 houses a pair of annular plungers 33 and 34, with seals 35 which are urged by a pair of springs 36 and 37 (the springs for storing energy) towards each other. Shoulders 38 on body 10 prevent the annular plungers 33 and 34 from meeting.

The wall of outer body 10 and that of pump cylinder 13 are both perforated with corresponding breathing channels 39 and 40, which communicate via the upper part 41 of annular discharge chamber 32. This upper part 41 also houses the upper spring 36 while the corresponding lower part 41a houses the lower spring 37.

In use, the pump as illustrated in FIGS. 17 and 18 is applied to the top of a container of liquid so that the non-return valve assembly is in contact with that liquid, if necessary via a dip-tube (not shown).

At the first downstroke of piston 14, the piston return 18 is compressed and air in bore 15 is bled via radial passageways 31, annular discharge chamber 32 to atmosphere, when radial ducts 17 line up with radial passageways 31. When piston 14 is released, liquid is drawn up through non-return valve assembly 22 into cylinder bore 15. This is a priming operation and the pump is now ready for use.

The the second downstroke of the piston 14, liquid within cylinder bore 15 is sujected to an increase in hydraulic pressure and it is thereby caused to flow via radial passageways 31 to annular discharge chamber 32 and annular plungers 33 and 34. Further increase in pressure on this liquid displaces the annular plungers 33 and 34 away from each other against their respective springs 36 and 37, so that liquid flows into the annular discharge chamber 32. As pistons 33 and 34 move apart, the volume of the annular discharge chamber 32 correspondingly increases and accummulating energy is stored in springs 36 and 37 as they are compressed. As pressure increases still further, displacement of annular plungers 33 and 34 continues to increase in order to accommodate liquid, until radial ducts 17 line up with radial passageways 31. The stored energy is then suddenly released and liquid is rapidly discharged to atmosphere via discharge outlet 16 in piston 14 and actuator button (not shown).

This coincidence of ducts with passageways constitutes the valve means for triggering the release of energy and for providing a discharge conduit for liquid product to be dispensed to atmosphere.

As liquid is discharged, decompression of springs 36 and 37 forces annular plungers 33 and 34 towards each other to the rest position where they abut shoulders 38 on outer body 10. The annular discharge chamber 32 is finally sealed when finger pressure on the pump is released, the piston 14 returning to the rest position under decompression of piston return spring 18. Simultaneously, more liquid product is drawn into the cylinder bore 15 via non-return valve assembly 22 and the discharge and filling cycle can then be repeated.

Figure 19:
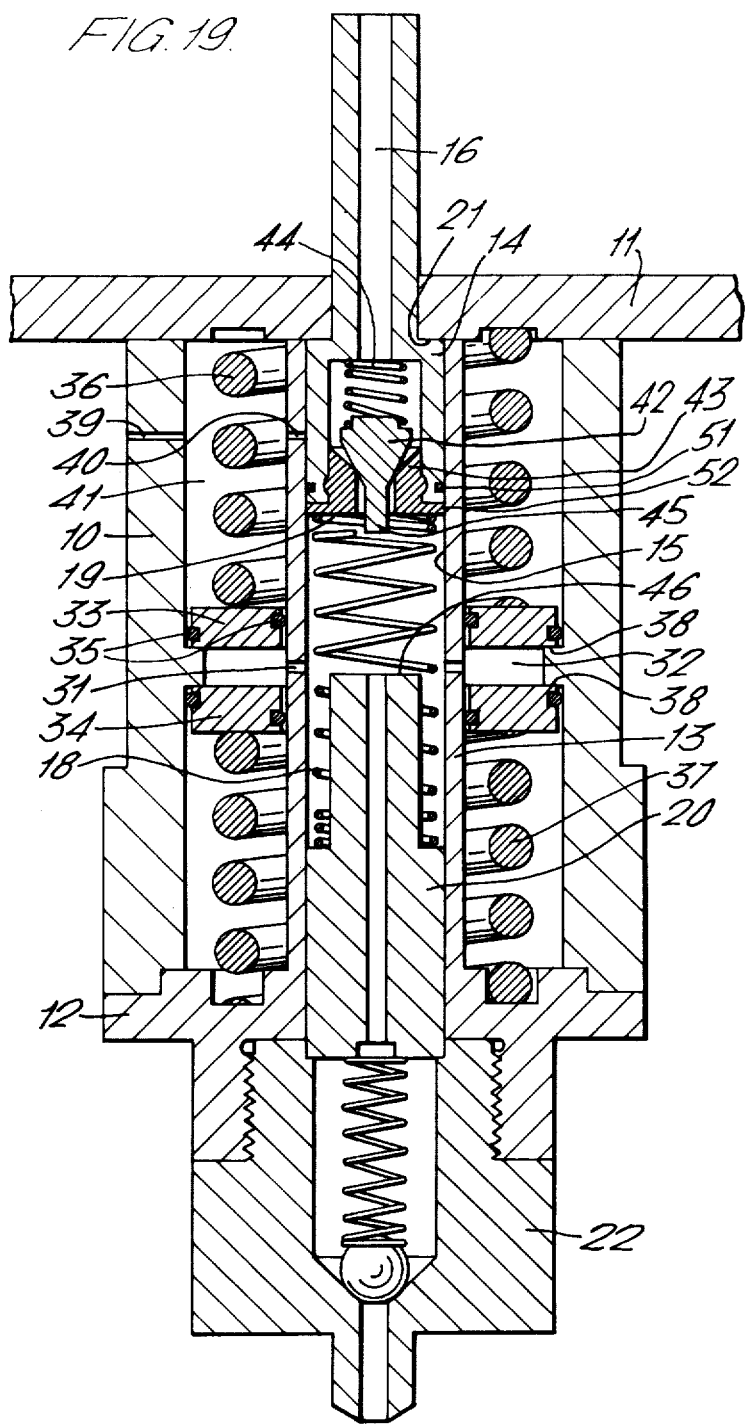
FIG. 19 is a section through a pump similar to that illustrated in FIGS. 2 and 3, except that a second plunger and spring have been added within the axial discharge chamber. The pump in FIG. 19 is shown in a non-actuating condition at the commencement of a downstroke.
Figure 20:
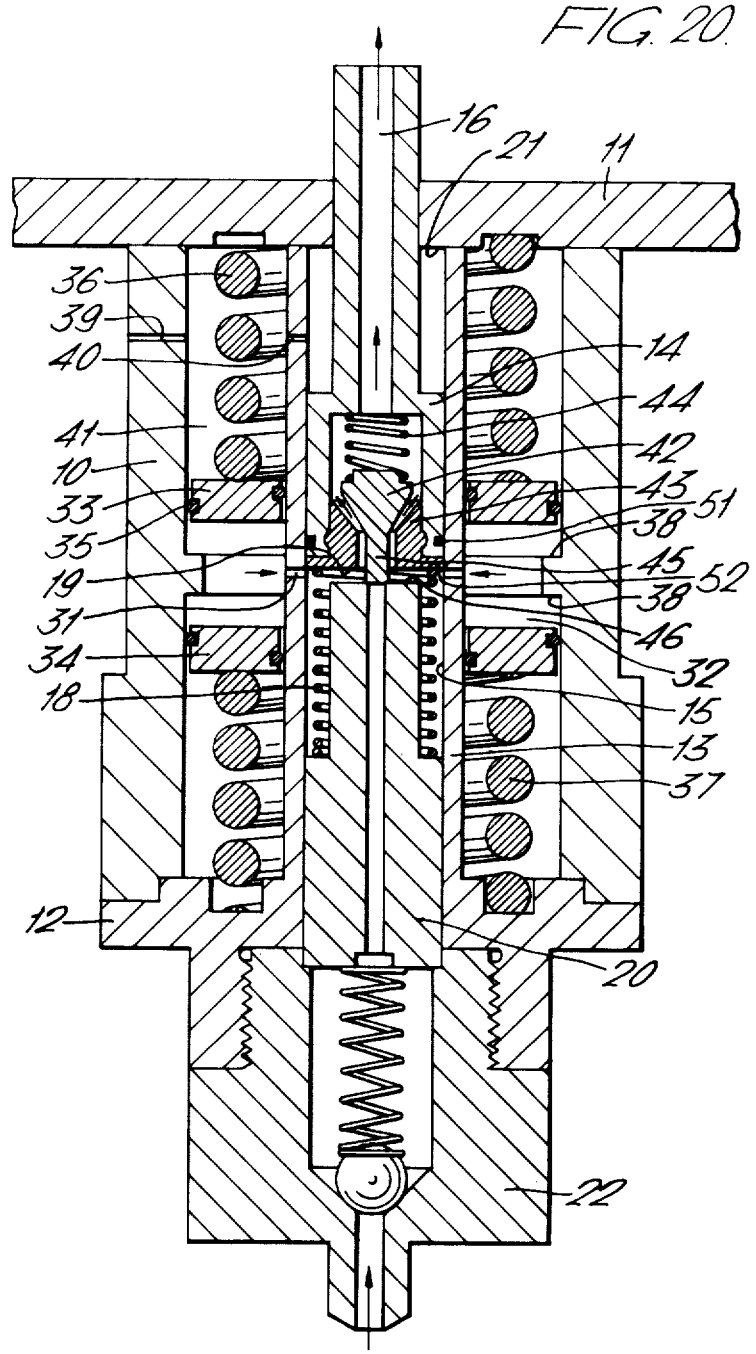
FIG. 20 is a section through a pump of the type shown in FIG. 19 in an actuating condition at the termination of a downstroke.

According to the fifth embodiment of the invention as illustrated in FIGS. 19 and 20 of the drawings, the pump is similar to that shown in FIGS. 17 and 18, except for the valve means provided for releasing energy and discharging liquid product from the pump. In this modification, as shown in FIGS. 19 and 20, the piston 14, together with its stem to which is fitted an actuator button (not shown) is hollow throughout its length but radial passageways 17 are omitted.

Fitted within the lower hollow end of piston 14 is a spigot valve 42 with associated seating 43, the spigot valve being biased towards the seating by spring 44 housed within the lower end of piston 14.

The stalk 45 of spigot valve 42 normally extends below the lower end of piston 14 as shown in FIG. 19 of the drawings, the stalk be ing arranged to contact an associated upper end 46 of spacer 20.

In use, the pump as illustrated in FIGS. 19 and 20 is fitted to the top of a container of liquid so that the non-return valve assembly is in contact with that liquid, if necessary via a dip-tube (not shown). The filling and discharge operations of this embodiment are similar to that described for the embodiment illustrated in FIGS. 17 and 18, except for the path taken by the liquid during a discharge sequence. In the modification shown in FIGS. 19 and 20, during a discharge stroke (downstroke), liquid is forced into annular discharge chamber 32 so displacing annular plungers 33 and 34 until the stalk 45 of spigot valve 42 contacts the upper end 46 of spacer 20. Continuation of the downstroke beyond this point unseats the spigot valve 42 and its displacement against bias of spring 44 allows liquid to pass from the annular discharge chamber 32 via radial passageways 31, cylinder bore 15 and past seating 43 to discharge outlet 16 in piston 14 and finally to atmosphere via actuator button (not shown).

As in the embodiment shown in the FIGS. 17 and 18, the annular discharge chamber 32 of this embodiment is finally sealed when finger pressure on pump dispenser is released, but in this embodiment, as piston 14 moves upwards, the stalk 45 of spigot valve 42 moves away from the associated upper end 46 of spacer 20, and spring 44 biases the spigot valve onto its seating 43 so halting passage of liquid past the spigot valve.

As the piston 14 returns to its rest position under decompression of piston return spring 18, more liquid product is drawn into bore 15 via non-return ball valve assembly 22 and the discharge and filling cycle can then be repeated.

Figure 21:
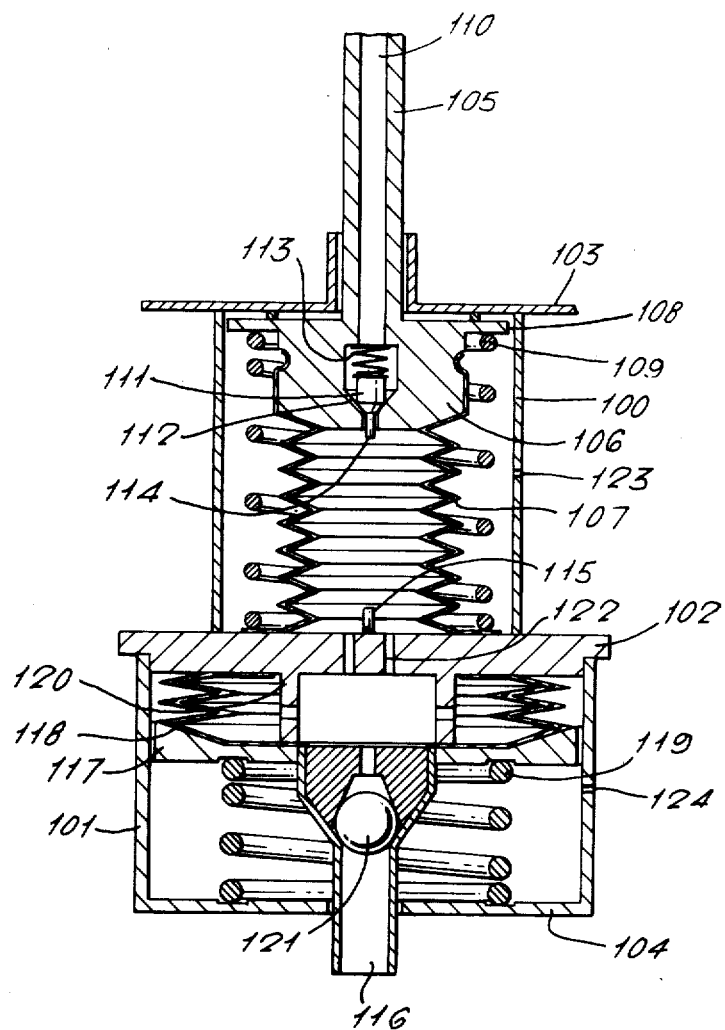
FIG. 21 is a section through a pump in accordance with the invention in a non-actuating condition at the commencement of a downstroke, the axial discharge chamber being set below the axial feed chamber, both chambers comprising bellows.
Figure 22:
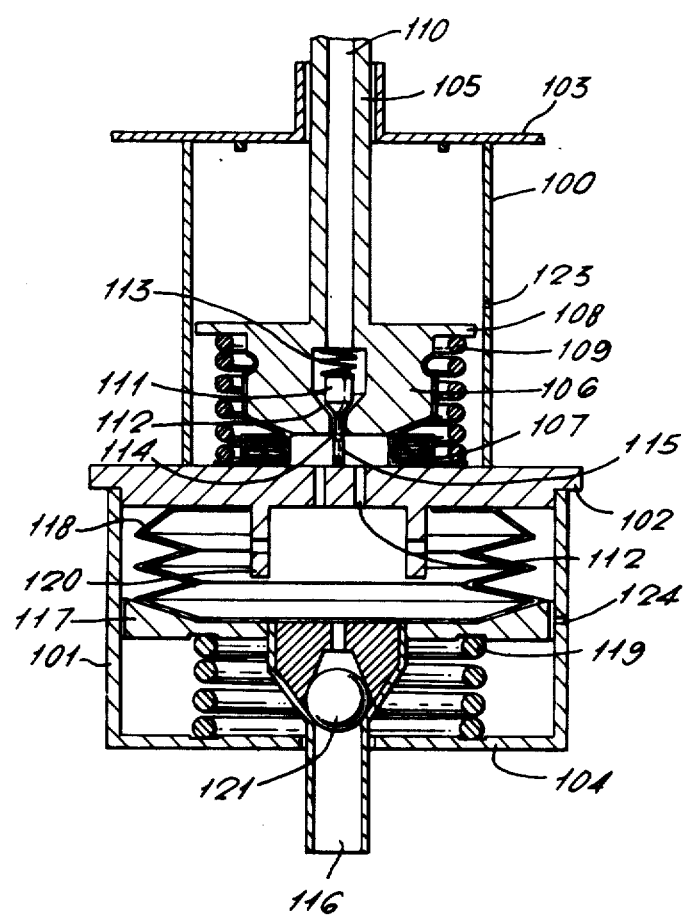
FIG. 22 is a section through a pump of the type shown in FIG. 21 in an actuating condition at the termination of a downstroke.

Accordiang to a sixth embodiment of the invention illustrated in FIGS. 21 and 22, the pump consists of an upper cylindrical guide compartment 100 and a lower cylindrical guide compartment 101 which are separated from each other by an apertured plate 102.

The upper cylindrical guide compartment 100 is closed at its upper end by an apertured closure member 103 and the lower cylindrical guide chamber 101 is closed at its lower end by apertured plate member 104.

Located within the upper compartment 100 is a first bellows assembly consisting of a hollow axial push rod 105 having an enlarged end portion 106 and an axially arranged cylindrical bellows 107, constructed of a suitable plastics material. The first bellows 107 and the end portion 106 together define the axial feed chamber having a finger displaceable end wall.

The first bellows 107 is welded at its lower rim to the upper face of apertured plate 102 and its upper rim forms a liquid-tight snap fit over the enlarged portion 106 of axial rod 105.

This enlarged portion is provided with flange member 108 which serves as one abutment for a first spring 109 and also locates the first bellows assembly centrally within the upper cylindrical guide compartment 100.

The axial rod 105 with its enlarged portion 106 is hollow throughout its length, the upper end as shown in the drawings forming a discharge outlet 110. Fitted within the lower end of the enlarged portion 106 is a spigot valve 111 with associated seating 112, the spigot valve being biased towards the seating by spigot spring 113 also housed within the englarged portion 106.

A stalk 114, which constitutes the opening means of the spigot valve 111 normally extends below the lower end of the enlarged portion 106 as shown in the drawings, the stalk being axially aligned with an associated abutment 115 located on the upper surface of apertured plate 102.

The discharge outlet 110 and housing of the spigot valve 111 together constitute the discharge conduit. The spigot valve in the valve means for releasing energy stored in the resilient means.

Spring 109 when fitted is under partial compression and normally urges the enlarged portion 106 upwards as shown in the drawings, to the position where the first bellows 107 is extended.

Located within the lower compartment 101 is a second bellows assembly consisting of a hollow axial diptube 16 having an enlarged annular end plate 117 at its upper end and a second cylindrical bellows 118, which is the axial discharge chamber, also constructed of plastics material. The second bellows 118 is welded at its upper rim to the lower face of apertured plate 102 and its lower rim forms a liquid tight snap fit over the annular end plate 117.

The annular end plate 117 serves as one abutment for a second spring 119, the resilient means for storing energy, and also locates the second bellows assembly centrally within the lower cylindrical guide compartment 101.

Spring 119 is when fitted also under partial compression and normally urges the second bellows assembly upwards as shown in the drawings, to the position where the second bellows 118 approaches its closed position. An annular apertured spacer 102 arranged axially and dependant from apertured plate 102 limits the upwards movement of the second bellows assembly, so preventing the second bellows from actually closing.

It will be noted that the first and second bellows are arranged in axial alignment with each other one above the other and are in communication via axial passageways 112.

Fitted within the upper end of the dip-tube 116 is a non-return ball valve assembly 121, which is positioned to admit liquid product to the first bellows from an external supply.

The first and second bellows assemblies communicate with each other via axially aligned passageways 122 within apertured plate 102.

The diameter of the first bellows 107 is less than that of the second bellows 118.

The walls of both the upper and lower cylindrical guide compartments are perforated at 123 and 124 respectively to provide breathing channels to assist in maintaining atmospheric pressure conditions within both guide chambers but exterior to both bellows units In use, the pump as illustrated in FIGS. 21 and 22 is applied to the top of a container of liquid, the container being sealed by apertured closure member 103, so that the non-return valve assembly is in contact with that liquid via the dip-tube 116.

At the first downstroke of hollow axial rod 105, spring 109 is compressed and air in the first bellows 107 is also compressed and is forced via axial passageways 122 into the second bellows 118. The second bellows 118 expands downwards as shown in the drawings to accommodate the air, so displacing the enlarged annular end-plate 117 (together with associated non-return ball valve assembly 121 and hollow axial dip-tube), against the spring 119.

When the stalk 114 of spigot valve 111 contacts the associated abutment 115, the spigot valve is displaced upwards so unseating it, and the air now in a compressed state escapes around the spigot valve, past spring 113 and hollow axial rod 105 to atmosphere via discharge outlet 110.

As the air escapes, the volume of the second bellows 118 decreases under the recovering action of spring 119. When the discharge of air ceases, the enlarged annular end-plate 117 comes to rest against the annular apertured spacer 120.

Release of finger force on the upper end of the hollow axial rod 105, allows the spigot valve 111 to become seated again at 112, and the first bellows 107 continues to expand and increase in volume under the recovering action of spring 109. At the same time, liquid product from the container (not shown) to which the pump is fitted is drawn into the second and then the first bellows 107 and 118 via the dip-tube 116 and the non-return ball valve assembly 121.

This sequence is a priming operation by which the pump is filled with liquid product prior to dispensing it for its intended purpose. It may be necessary to repeat the priming operation two or three times in order to expel air trapped within the pump.

When liquid product is to be dispensed, the pump is operated in exactly the same sequence as that described for the priming operation. Thus liquid product held in the first bellows is forced during a down-stroke of the finger-actuated hollow axial rod 105 into the second bellows 118 which expands against the bias of spring 119 to accommodate it. The spigot valve 111 remains seated at 112 during the down-stroke unitl at the lowermost point of the stroke, its stalk 114 is displaced upwards by the associated abutment 115, so opening the seating 112 of spigot valve 111.

Liquid product under pressure is then suddenly released to atmosphere via a suitable actuator button (not shown), while the hollow axial rod 105 is held at its lowermost point of travel. Liquid product continues to be dispensed as spring 119 urges enlarged annular plate 117 towards annular apertured spacer 120.

Dispensing of the liquid product ceases abruptly when the annular apertured spacer 120 arrests further upward movement of the enlarged annular plate 117, or when finger force on the hollow axial rod 105 is released so closing spigot valve 111 against seating 112.

It will be noted that the finger displaceable end wall (ie end portion 106) and the side wall of the feed chamber (ie first bellows 107) form a liquid tight seal at least until the valve means (ie spigot valve 111) is operated.

After dispensation, the pump is automatically refilled with liquid product from the container (not shown) by being drawn up via dip-tube 116 and non-return ball valve assembly 121 on release of finger force from hollow axial rod 105.

The actual volume of liquid dispensed from the pump can be preset by the axial length of the annular apertured spacer 120.

It is a feature of the pump dispenser that the characteristics of successive dispensing actions are uniform and predictable and are independent of the force applied by the finger, since actuation does not occur until the downstroke has been completed. There is, furthermore, no dribble or droplet formation at the beginning or at the end of a dispensing stroke.

It should be explained further that as the push-rod 105 is pushed downwards as shown in the drawings under the influence of applied finger force, the two springs 109 and 119 are progressively compressed as the first bellows 107 is collapsed and the second bellows 118 is extended to its uncollapsed state, due to the passage of liquid under increasing pressure from the first bellows to the second bellows.

The first spring 109 functions as a return spring eventually to extend the first bellows unit 107 to its uncollapsed state, while the second spring 119 acts as an accumulator of energy which is stored until the moment of discharge of the pressurised liquid to atmosphere.

It follows that the spigot valve is opened at the end of the push-rod 105 down-stroke and that liquid under excess pressure is discharged to atmosphere by the release of energy from the second spring 119 as it decompresses. The first spring 109 cannot extend the first bellows unit 107 to its uncollapsed state until finger force on the push rod 105 is slackened or released.

The pump according to the invention is intended to be used for dispensing liquids or gels, in particular shearable gels, from a container which provides a supply of liquid or gel product external to the pump. The pump can therefore, for example, be designed for attachment to a hand held container of a size and capacity similar to a conventional pressurised pack or aerosol container. It is also envisaged that the pump can be readily detachable from its container so that a refill container can be fitted when the original container is empty of product.

The liquid or gel product can be dispensed as a fine particulate spray or in any other form in which the product is not finely divided, depending on the type of actuator button which is fitted to the pump.

I claim:

1. A finger operable pump for dispensing liquids comprising:
   a. an axially arranged feed chamber having a finger displaceable end wall, axial movement of which will vary the volume of said feed chamber;
   b. a pressure actuable valve to permit entry of a liquid product from an external supply to the feed chamber, said valve and said feed chamber being so positioned that downward axial movement of the finger displaceable end wall toward said valve reduces the volume of the feed chamber and increases hydraulic pressure therewithin, and upward axial movement of the finger displaceable end wall away from said valve increases the volume of the feed chamber and reduces hydraulic pressure therewithin;
   c. an axial discharge chamber in communication with said feed chamber;
   d. a resilient means positioned co-operably with the discharge chamber for storing energy generated by the increased hydraulic pressure which results from downward movement of the finger displaceable end wall with respect to the feed chamber;
   e. a discharge conduit communicating the discharge chamber with the atmosphere exterior to the pump;
   f. valve means for releasing the energy stored in the resilient means and for conducting the liquid product from the discharge chamber to the discharge conduit, said valve means being operable to release the energy and provide a conduit for the liquid product only after the finger displaceable end wall has moved downwardly with respect to the feed chamber by a predetermined distance, the finger displaceable end wall forming a liquid tight seal with a side wall of the chamber at least until after said valve means is operated.

2. A pump as claimed in claim 1, wherein the axially arranged feed chamber is a cylinder and the finger displaceable end wall is a piston slidably positioned in the cylinder.

3. A pump as claimed in claim 1, wherein the axially arranged feed chamber is a bellows and the finger displaceable end wall is an end wall of the bellows, downward movement of said end wall reducing the axial length of the bellows towards its collapsed state, and upward movement of said end wall increasing axial length of the bellows towards its fully extended state.

4. The pump as claimed in claim 1, wherein the pressure actuable valve is a ball valve.

5. The pump as claimed in claim 1, wherein the resilient means is a coil spring.

6. The pump as claimed in claim 1, wherein the axial discharge chamber houses a plunger resiliently loaded by the resilient means.

7. The pump as claimed in claim 6, wherein the axial discharge chamber houses a second plunger in addition to the first, the second plunger being resiliently loaded by the resilient means.

8. A pump as claimed in claim 1, wherein the axial discharge chamber houses a bellows for containing the liquid product passing from the axially arranged feed chamber when hydraulic pressure in said feed chamber is increasing, the bellows being resiliently loaded by the resilient means.

9. The pump as claimed in claim 1, wherein the cross-sectional area of the axially arranged feed chamber is less than that of the axial discharge chamber.

10. A pump as claimed in claim 1, wherein the axial discharge chamber and the axial feed chamber communicate with each other by means of at least one radial passageway which provides a conduit for the liquid product to pass between said chambers.

11. A pump as claimed in claim 1, wherein the axial discharge chamber is an annular discharge chamber.

12. The pump as claimed in claim 1, wherein valve means for releasing the energy stored in the resilient means is provided by the coincidence of a radial passageway interconnecting the axial discharge chamber and the discharge conduit, said coincidence permitting the liquid product to exit from the axial discharge chamber to atmosphere.

13. The pump as claimed in claim 1, wherein the valve means for releasing the energy stored in the resilient means is provided by a mechanically actuable valve opening axially through the finger displaceable end wall of the feed chamber, the mechanically actuable valve being so positioned as to be mechanically actuated at the termination of a downward movement of the finger displaceable end wall when the volume of the feed chamber approaches its minimum value.

14. The pump as claimed in claim 13, wherein the mechanically actuable valve is a spigot valve.

15. A pummp for dispensing liquids comprising:
a. a cylinder;
b. a pressure actuable valve to permit entry of a liquid product to the cylinder from an external supply;
c. a finger displaceable piston slideably positioned in the cylinder, the piston increasing hydraulic pressure in the cylinder as it moves downwardly in the cylinder toward the pressure actuable valve and reducing hydraulic pressure as it moves upwardly in the cylinder away from the pressure actuable valve;
d. an annular discharge chamber;
e. at least one radial passageway interconnecting the cylinder and the annular discharge chamber, the passageway providing a conduit for the liquid product from the cylinder to the annular discharge chamber when the hydraulic pressure in the cylinder is increased by the piston sliding downwardly in the cylinder;
f. a resilient means, positioned co-operably with the discharge chamber, for storing the energy generated by the increased hydraulic pressure which results from the piston slidably downwardly in the cylinder;
g. a discharge conduit communicating the discharge chamber with the atmosphere exterior to the pump; and
h. valve means for releasing the energy stored in the resilient means and conducting the liquid product from the annular discharge chamber to the discharge conduit, said means being operable to release the energy and provide a conduit for the liquid product only after the piston has moved downwardly in the cylinder by a predetermined distance, the piston forming a liquid tight seal with the cylinder at least until after said valve means is operated.

16. A pump for dispensing liquids comprising:
a. a cylinder;
b. a pressure actuable valve to permit entry of a liquid product to the cylinder from an external supply;
c. a finger displaceable piston slideably positioned in the cylinder, the piston increasing hydraulic pressure in the cylinder as it moves downwardly in the cylinder toward the pressure actuable valve and reducing hydraulic pressure as it moves upwardly in the cylinder away from the pressure actuable valve;
d. an annular discharge chamber positioned co-axially with respect to the cylinder and piston, said discharge chamber being in communication with said cylinder;
e. a spring for storing energy generated by the increased hydraulic pressure which results from the piston sliding downwardly in the cylinder, said spring being positioned co-operably with the annular discharge chamber;
f. a discharge conduit communicating the discharge chamber with the atmosphere exterior to the pump; and
g. a spigot valve for releasing the energy stored in the spring and conducting the liquid product from the annular discharge chamber to the discharge conduit, said spigot valve being operable to release the energy and provide a conduit for the liquid product only after the piston has moved downwardly in the cylinder by a predetermined distance, and the piston forming a liquid tight seal with the cylinder at least until after the spigot valve is operated.

17. A pump for dispensing liquids comprising:
a. an axially arranged first bellows having a sealably engaged finger displaceable end wall, axial movement of which will vary the volume of said first bellows;
b. a pressure actuable valve to permit entry of a liquid product from an external supply to the first bellows, said valve and said first bellows being so positioned that downward axial movement of the finger displaceable end wall toward the valve reduces the volume of the first bellows and increases hydraulic pressure therewithin, and upward axial movement of the finger displaceable end wall away from the valve increases the volume of the first bellows and reduces hydraulic pressure therewithin;

c. an axial discharge chamber comprising a second bellows in communication with the first bellows, said second bellows being arranged to receive liquid product passing from the first bellows when hydraulic pressure in said first bellows is increasing;

d. a spring for storing energy generated by the increasing hydraulic pressure which results from the finger displaceable end wall of the first bellows moving downwardly with respect to the first bellows thereby to reduce the volume of the first bellows, said spring being positioned co-operably with the second bellows so as to bias the second bellows toward its collapsed state;

e. a discharge conduit communicating the second bellows with the atmosphere exterior to the pump; and f. a mechanically actuable valve opening axially through the finger displaceable end wall of the first bellows, said mechanically actuable valve being so positioned as to be mechanically actuated at the termination of a downward movement of the finger displaceable end wall of the first bellows when the volume of the first bellows is at its minimum value, thereby to release the energy and provide a conduit for the liquid product, the first bellows and its finger displaceable end wall forming a liquid tight seal at least until after the mechanically actuable valve is activated.

* * * * *